United States Patent
Williams et al.

(10) Patent No.: US 11,870,086 B2
(45) Date of Patent: *Jan. 9, 2024

(54) TRIPOD SYSTEM

(71) Applicant: TECHTRONIC CORDLESS GP, Anderson, SC (US)

(72) Inventors: Brianna E. Williams, Greenville, SC (US); J. Luke Jenkins, Williamston, SC (US); Robert Andrew Patrick, Simpsonville, SC (US)

(73) Assignee: Techtronic Cordless GP, Anderson, SC (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/062,121

(22) Filed: Dec. 6, 2022

(65) Prior Publication Data

US 2023/0100066 A1 Mar. 30, 2023

Related U.S. Application Data

(63) Continuation of application No. 17/747,581, filed on May 18, 2022, now Pat. No. 11,552,365, which is a
(Continued)

(51) Int. Cl.
*H01M 50/207* (2021.01)
*F16M 11/08* (2006.01)
(Continued)

(52) U.S. Cl.
CPC ........ *H01M 50/207* (2021.01); *F16M 11/041* (2013.01); *F16M 11/08* (2013.01); *F16M 11/242* (2013.01); *H01M 2220/30* (2013.01)

(58) Field of Classification Search
CPC .... F16M 11/041; F16M 11/08; F16M 11/242; H01M 2220/30; H01M 50/207
See application file for complete search history.

(56) References Cited

U.S. PATENT DOCUMENTS

| 4,341,452 A | 7/1982 | Korling |
| 6,779,932 B2 | 8/2004 | Desorbo et al. |
| (Continued) | | |

FOREIGN PATENT DOCUMENTS

| CN | 2681367 Y | 2/2005 |
| CN | 103176338 A | 6/2013 |
| (Continued) | | |

OTHER PUBLICATIONS

Extended European Search Report for Application No. 21194178.6 dated Jun. 1, 2022 (9 pages).

*Primary Examiner* — Forrest M Phillips
(74) *Attorney, Agent, or Firm* — Michael Best & Friedrich LLP

(57) ABSTRACT

A tripod includes a main body having a center column with a first end, a second end opposite the first end, and a longitudinal axis extending through the first end and the second end, and a plurality of legs coupled to the center column. The tripod system also includes a battery receptacle supported at the first end of the center column. The battery receptacle has a first interface configured to mechanically and electrically couple to a battery pack. The tripod system further includes a head supported at the second end of the center column. The head has a second interface configured to mechanically and electrically couple to a luminaire. The second interface is complementary to the first interface.

20 Claims, 34 Drawing Sheets

Related U.S. Application Data continuation of application No. 17/446,108, filed on Aug. 26, 2021.

(60) Provisional application No. 63/082,212, filed on Sep. 23, 2020, provisional application No. 63/072,383, filed on Aug. 31, 2020.

(51) Int. Cl.
*F16M 11/24* (2006.01)
*F16M 11/04* (2006.01)

(56) References Cited

U.S. PATENT DOCUMENTS

| | | | |
|---|---|---|---|
| 6,902,294 B2 | 6/2005 | Wright | |
| 6,929,409 B2 | 8/2005 | Desorbo et al. | |
| 7,293,924 B2 | 11/2007 | Desorbo et al. | |
| 7,296,909 B2 | 11/2007 | Van Deursen et al. | |
| 7,318,678 B2 | 1/2008 | Desorbo et al. | |
| 7,342,360 B2 | 3/2008 | Van Deursen et al. | |
| 7,344,320 B2 | 3/2008 | Barker et al. | |
| 7,364,320 B2 | 4/2008 | Van Deursen et al. | |
| 7,551,225 B2 | 6/2009 | Overstreet | |
| 7,905,667 B2 | 3/2011 | Barker | |
| 7,997,753 B2 | 8/2011 | Walesa et al. | |
| 8,025,418 B2 | 9/2011 | Zick | |
| 8,066,236 B2 | 11/2011 | Peterson et al. | |
| 8,196,504 B2 | 6/2012 | Keng | |
| 8,201,979 B2 | 6/2012 | Deighton et al. | |
| 8,261,954 B2 | 9/2012 | Lee | |
| 8,269,884 B2 | 9/2012 | Overstreet | |
| 8,439,239 B2 | 5/2013 | Lee | |
| 8,537,013 B2 | 9/2013 | Yeager et al. | |
| 8,602,277 B2 | 12/2013 | Lee | |
| 8,613,379 B2 | 12/2013 | Lee | |
| 8,651,438 B2 | 2/2014 | Deighton et al. | |
| 8,684,327 B2 | 4/2014 | Caswell | |
| 8,726,439 B2 | 5/2014 | Orzeck et al. | |
| 8,733,715 B2 | 5/2014 | Lee | |
| 8,931,932 B2 | 1/2015 | Lipscomb et al. | |
| 9,050,513 B2 | 6/2015 | Caswell | |
| D743,603 S | 11/2015 | Inskeep | |
| 9,303,853 B2 | 4/2016 | Deighton | |
| 9,381,976 B1 * | 7/2016 | Corley | B63B 17/00 |
| 9,465,278 B2 | 10/2016 | Lytle | |
| 9,586,312 B2 | 3/2017 | Buchner et al. | |
| 9,605,816 B2 | 3/2017 | Lin et al. | |
| 9,810,408 B2 * | 11/2017 | Fang | F16M 1/00 |
| 9,904,150 B1 | 2/2018 | Zhu et al. | |
| 9,981,723 B2 | 5/2018 | Corley | |
| 10,067,409 B2 | 9/2018 | Elias | |
| 10,072,790 B2 | 9/2018 | Chen et al. | |
| 10,082,239 B2 | 9/2018 | Caswell | |
| 10,312,706 B2 | 6/2019 | Corley | |
| 10,514,126 B2 | 12/2019 | Asante | |
| 10,571,783 B1 | 2/2020 | Dikeman | |
| 10,578,953 B1 * | 3/2020 | Hallett | F16M 11/2092 |
| 10,634,327 B2 * | 4/2020 | Cornell | F16M 11/12 |
| 10,642,131 B2 | 5/2020 | Elias | |
| 10,690,304 B2 * | 6/2020 | Adams | F21V 11/16 |
| 10,787,239 B2 | 9/2020 | Corley | |
| 10,837,594 B2 | 11/2020 | Asante | |
| 11,016,369 B2 | 5/2021 | Elias | |
| 11,112,096 B2 * | 9/2021 | Harvey | F21V 21/06 |
| 11,143,356 B2 | 10/2021 | Dunn | |
| 11,262,020 B2 * | 3/2022 | Wenzel | F16M 11/04 |
| 11,552,365 B2 * | 1/2023 | Williams | H01M 50/262 |
| 2006/0175484 A1 | 8/2006 | Wood, III et al. | |
| 2008/0023607 A1 | 1/2008 | Barker | |
| 2010/0237206 A1 | 9/2010 | Barker | |
| 2011/0255929 A1 | 10/2011 | Buchner | |
| 2012/0181979 A1 | 7/2012 | Hudspeth et al. | |
| 2012/0294672 A1 | 11/2012 | Hicks | |
| 2013/0134268 A1 | 5/2013 | Wessells et al. | |
| 2013/0146742 A1 | 6/2013 | Wessells et al. | |
| 2013/0153718 A1 | 6/2013 | Wessells et al. | |
| 2013/0185912 A1 | 7/2013 | Choy | |
| 2013/0189027 A1 | 7/2013 | Wessells et al. | |
| 2013/0265780 A1 | 10/2013 | Choksi et al. | |
| 2014/0268775 A1 | 9/2014 | Kennemer et al. | |
| 2014/0338132 A1 | 11/2014 | Orzeck et al. | |
| 2015/0076297 A1 | 3/2015 | Parrill | |
| 2016/0175609 A1 | 6/2016 | Dye et al. | |
| 2016/0218547 A1 | 7/2016 | Corley | |
| 2016/0218548 A1 | 7/2016 | Corley | |
| 2017/0141597 A1 | 5/2017 | Mifsud | |
| 2017/0157727 A1 | 6/2017 | Felton et al. | |
| 2020/0116176 A1 | 4/2020 | Dunn | |
| 2020/0116296 A1 | 4/2020 | Dunn | |
| 2020/0156743 A1 | 5/2020 | Corley | |
| 2020/0156754 A1 | 5/2020 | Corley | |
| 2021/0232025 A1 | 7/2021 | Elias | |
| 2021/0400175 A1 * | 12/2021 | Dunn | F16M 11/16 |
| 2022/0069399 A1 | 3/2022 | Williams et al. | |
| 2022/0082887 A1 | 3/2022 | Kouyama | |

FOREIGN PATENT DOCUMENTS

| | | |
|---|---|---|
| CN | 204372494 U | 6/2015 |
| CN | 204372495 U | 6/2015 |
| CN | 204459668 U | 7/2015 |
| CN | 204756362 U | 11/2015 |
| CN | 206093399 U | 4/2017 |
| CN | 206754753 U | 12/2017 |
| CN | 207601481 U | 7/2018 |
| CN | 207921674 U | 9/2018 |
| CN | 208011176 U | 10/2018 |
| CN | 109708062 A | 5/2019 |
| CN | 212080732 U | 12/2020 |
| CN | 214425544 U | 10/2021 |
| DE | 202004001225 U1 | 4/2004 |
| DE | 202014003653 U1 | 7/2014 |
| FR | 2745958 B1 | 9/1997 |
| GB | 177844 A | 4/1922 |
| GB | 905332 A | 9/1962 |
| WO | 2005017405 A1 | 2/2005 |
| WO | 2007017011 A1 | 2/2007 |
| WO | 2013117939 A1 | 8/2013 |
| WO | 2017192876 A1 | 11/2017 |

* cited by examiner

US 11,870,086 B2

TRIPOD SYSTEM

CROSS-REFERENCE TO RELATED APPLICATIONS

This application is a continuation of U.S. patent application Ser. No. 17/747,581, filed May 18, 2022, which is a continuation of U.S. patent application Ser. No. 17/446,108, filed Aug. 26, 2021, which claims priority to U.S. Provisional Application No. 63/072,383, filed Aug. 31, 2020, and to U.S. Provisional Application No. 63/082,212, filed Sep. 23, 2020, the entire contents of which are incorporated by reference herein.

BACKGROUND

The application relates to a tripod system and, more particularly, to a tripod system including interchangeable accessory devices.

Tripods are often used to support different types of devices, such as cameras, lights, and fans. Typically, the devices supported by the tripod are powered by their own dedicated power sources.

SUMMARY

In one aspect, a tripod for use with an accessory device and a battery pack may include a main body, a battery receptacle, and a head. The main body may include a center column having a first end, a second end opposite the first end, and a longitudinal axis extending through the first end and the second end. The main body may also include a plurality of legs coupled to the center column. The battery receptacle may be supported on the main body. The battery receptacle may have a first interface configured to mechanically and electrically couple to the battery pack. The head may be supported at the second end of the center column. The head may have a second interface configured to mechanically and electrically couple to the accessory device. The first interface may have a complementary configuration to the second interface.

In another aspect, a tripod system may include a tripod, a battery pack, and an accessory device. The tripod may have a center column, a plurality of legs coupled to the center column, a battery receptacle supported by the center column or one of the plurality of legs, and a head supported by the center column. The battery pack may be removably coupled to the battery receptacle. The accessory device may be removably coupled to the head such that the accessory device is electrically powered by the battery pack through the tripod. The accessory device may be removable from the head and couplable directly to the battery pack.

In another aspect, a tripod system may include a tripod and an accessory device. The tripod may include a center column, a plurality of legs coupled to the center column, and a battery receptacle having a first receptacle interface and a second receptacle interface. The first receptacle interface may removably couple to a first battery pack having a first voltage. The second receptacle interface may removably couple to a second battery pack having a second voltage that is different than the first voltage. The battery receptacle may alternately receive the first battery pack and the second battery pack. The accessory device may be supported by the center column. The accessory device may be powered by the first battery pack when the first battery pack is coupled to the battery receptacle and may be powered by the second battery pack when the second battery pack is coupled to the battery receptacle.

Other aspects will become apparent by consideration of the detailed description and the accompanying drawings.

Before any embodiments of the disclosure are explained in detail, it is to be understood that the disclosure is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

DETAILED DESCRIPTION OF THE DRAWINGS

FIGS. 1-8 illustrate a tripod system 10 for supporting a variety of devices over a floor, ground, or other surface. The system 10 may include a tripod 14, an accessory device 200, and a battery pack 300.

Figure 1:
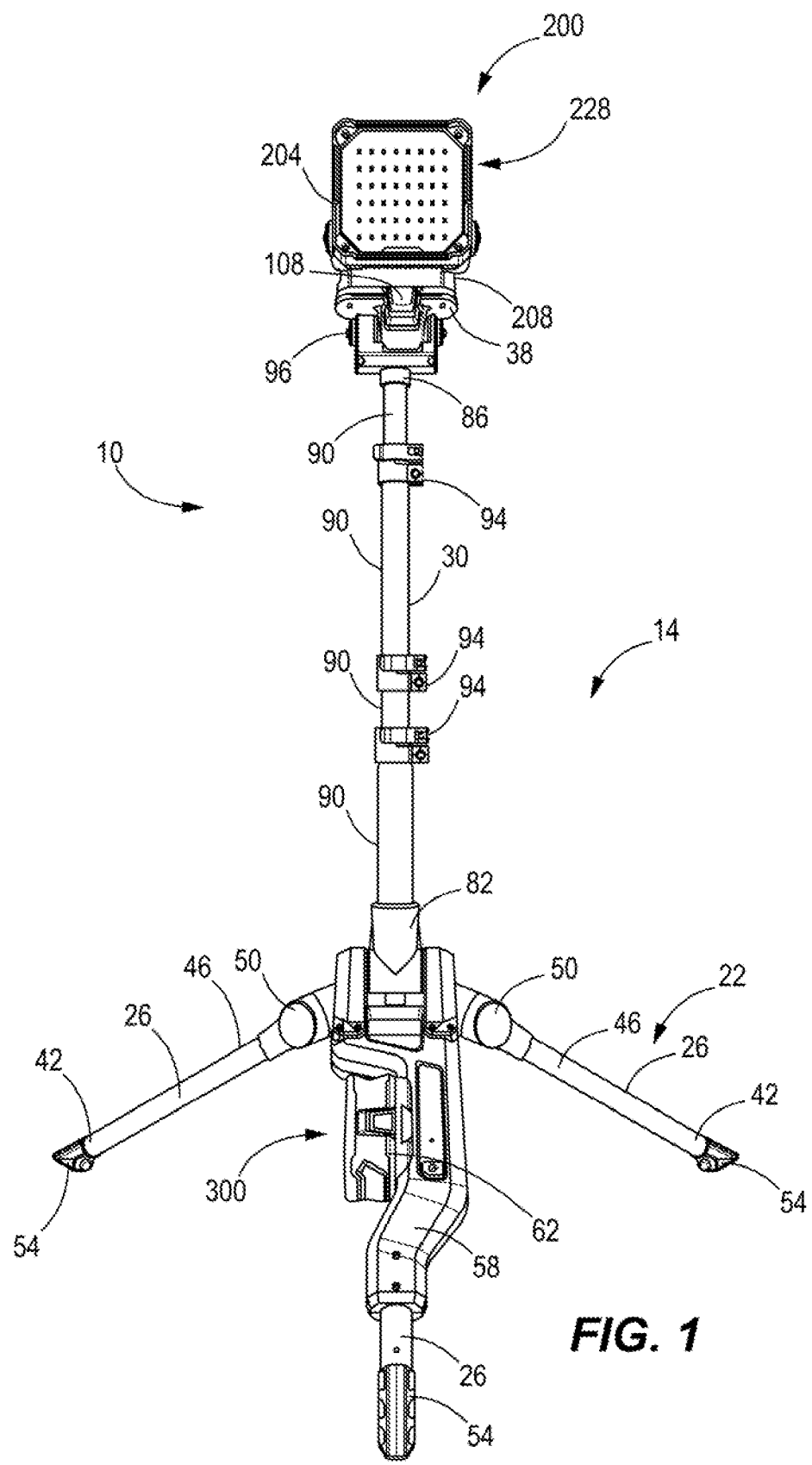
FIG. 1 is a perspective view of a tripod system including a tripod, a battery pack, and a first embodiment of an accessory device in a first assembly state.
Figure 2:
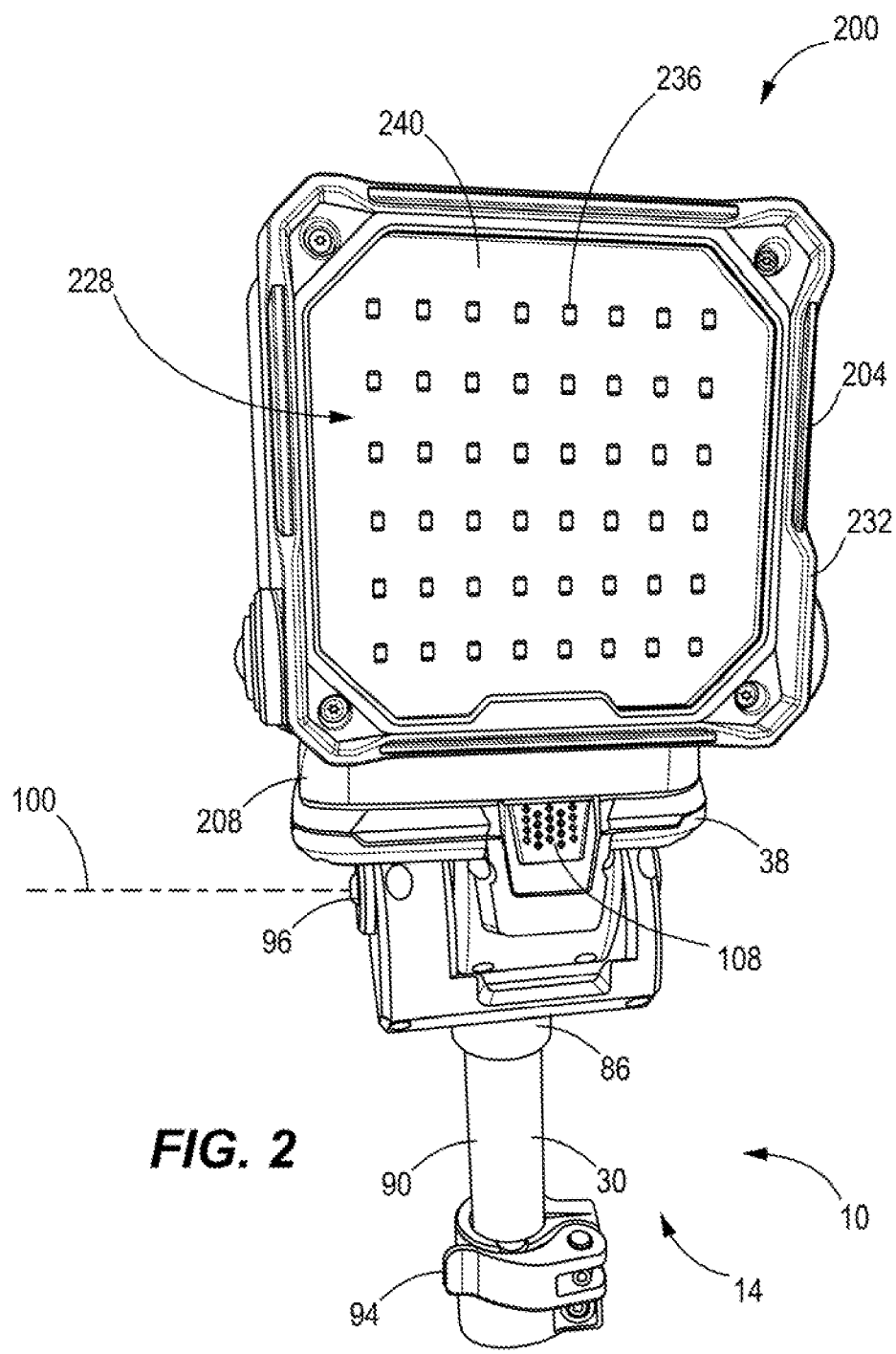
FIG. 2 is a front view of a portion of the tripod system of FIG. 1.

FIG. 1 illustrates the tripod 14. The tripod 14 may physically support the accessory device 200 over the ground and/or electrically communicate with the accessory device 200. The tripod 14 may additionally mechanically support and/or electrically communicate with the battery pack 300.

The tripod 14 may include a plurality of legs 22, a center column 30, an electrical system, and a head 38. In the illustrated embodiment, the plurality of legs 22 may include three legs 26. Each leg 26 may have a first end 42 positioned adjacent the ground and a second end 46 connected to the center column 30. The second end 46 of each leg 26 may be connected to the center column 30 by a leg joint 50. The joints 50 may allow the legs 26 to be collapsed toward the center column 30 to facilitate easy storage and transport. As such, the legs 26 may be pivotally coupled to the center column 30 at the second ends 46. Each leg 26 may include a foot 54 disposed on the first end 42. In some embodiments, the feet 54 may be formed as rubber tips that increase friction and inhibit sliding along the ground. In some embodiments, the legs 26 may be extendable. In some embodiments, the tripod 14 may be a support stand with a set of legs 22 including more than three legs 26.

In the illustrated embodiment, one of the legs 26 may be a receptacle leg 58. The receptacle leg 58 may include a battery receptacle 62 provided thereon. For example, the battery receptacle 62 may be disposed between the first end 42 and the second end 46. In some embodiments, the battery receptacle 62 may be positioned elsewhere on the tripod 14. For example, the battery receptacle 62 may be positioned on a lower end of the center column 30. The battery receptacle 62 may include a receptacle surface having receptacle electrical contacts, receptacle mounting features, and a receptacle latch portion. In some embodiments, the receptacle electrical contacts may be positioned on the receptacle mounting features. In some embodiments, the receptacle electrical contacts may be positioned elsewhere on the receptacle surface. The receptacle latch portion may be formed as a pair of ridges or shelves positioned on or adjacent to opposite sides of the receptacle surface.

With continued reference to FIG. 1, the center column 30 may have a first end 82 and a second end 86 opposite the column first end 82. The first end 82 may be coupled to the legs 22. The second end 86 may support the head 38. The center column 30 may be adjustable. For example, the center column 30 may include a series of telescoping members, such as tubes 90 and related friction clamps 94, that allow the length of the center column 30 to be adjusted, thereby adjusting the height of the head 38 with respect to the ground. In the illustrated embodiment, the center column 30 includes three telescoping tubes 90. In some embodiments, the center column 30 may include fewer or more telescoping tubes 90. In some embodiments, the length of the center column 30 may be fixed.

Figure 3:
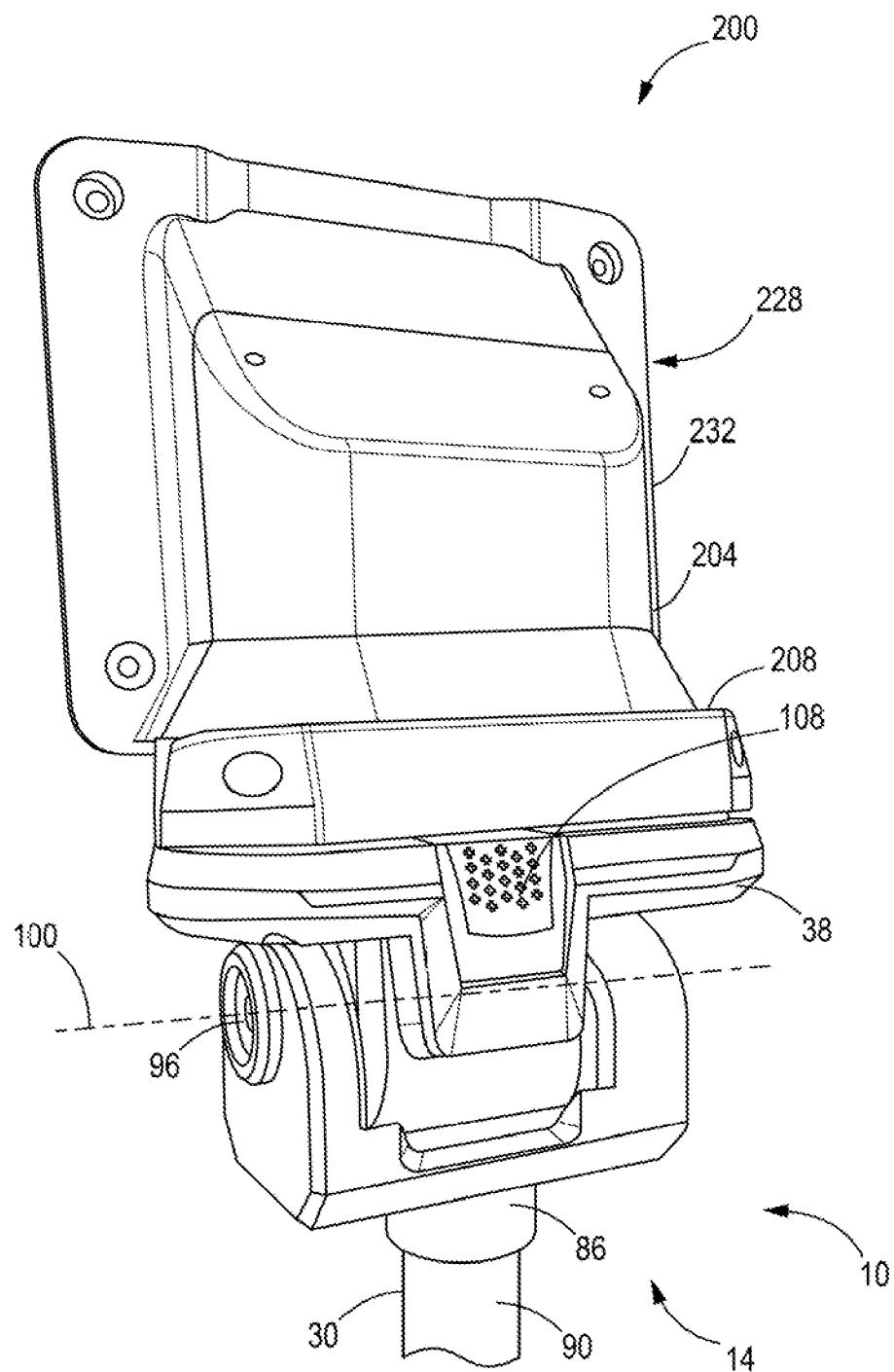
FIG. 3 is a rear view of the portion of the tripod system of FIG. 2.
Figure 4:
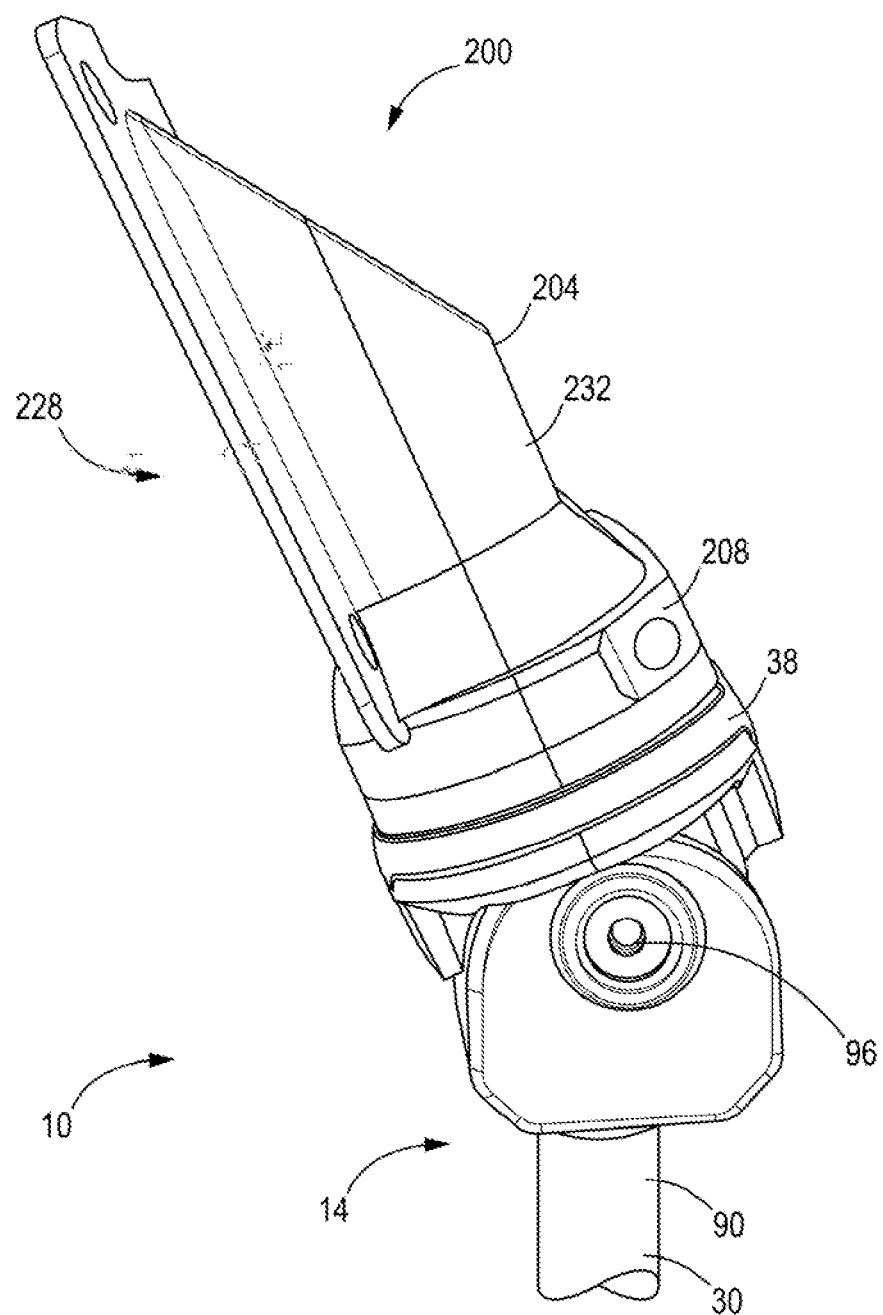
FIG. 4 is a side view of the portion of the tripod system of FIG. 2.

FIGS. 2-5 illustrate the head 38 of the tripod 14. The head 38 may selectively engage the accessory device 200. In some embodiments, the head 38 may be movable relative to the center column 30. For example, the head 38 may be coupled to the column second end 86 by a joint 96. As shown in FIG. 3, the joint 96 may allow the head 38 and supported accessory device 200 to rotate or pivot about a pivot axis 100. In the illustrated embodiment, the pivot axis 100 may be parallel to the ground and perpendicular to the length of the center column 30. In some embodiments, the pivot axis 100 may be oriented at an oblique angle relative to the ground. In some embodiments, the joint 96 is a universal joint (e.g., a ball joint) that may be moved to any desirable orientation respective to the ground.

Figure 5:
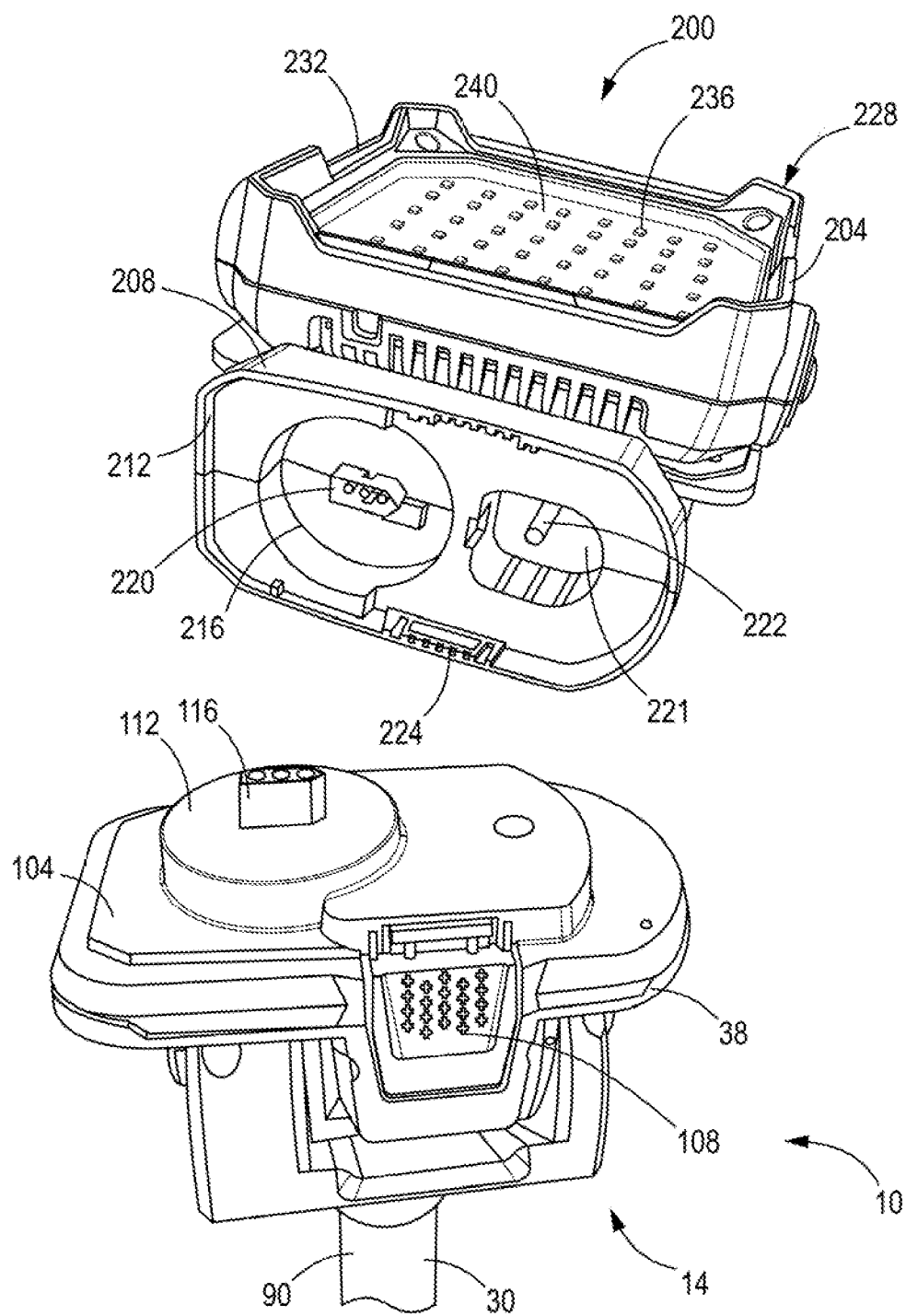
FIG. 5 is a perspective view of the tripod system of FIG. 1 with the accessory device in an uncoupled state from the tripod.

As shown in FIG. 5, the head 38 may include a head surface 104 and a head latch 108. The head surface 104 may include head mounting features 112 and head electrical contacts 116. In some embodiments, the head electrical contacts 116 may be positioned on the head mounting features 112. In some embodiments, the head electrical contacts 116 may be positioned elsewhere on the head surface 104. The head mounting features 112 may be configured to engage corresponding features on the accessory device 200 (FIG. 1). The head electrical contacts 116 may also be configured to engage corresponding electrical contacts on the accessory device 200. The head latch 108 may be positioned on or adjacent the head surface 104 and may be operable to retain the accessory device 200 adjacent the head surface 104. In some embodiments, the head 38 may include two head latches 108 positioned on opposite sides of the head surface 104.

With reference back to FIG. 1, the tripod electrical system may provide electrical communication between the receptacle electrical contacts (i.e., contacts disposed in the battery receptacle 62) and the head electrical contacts 116 so that DC power may pass from the battery to the head electrical contacts 116 and ultimately to the respective accessory device 200. In some embodiments, the electrical system may include electrically conductive wires that extend within the receptacle leg 58 and through the center column 30, the joint 96, and into the head 38. In some embodiments, the electrical system may be formed of other electrical conduits connecting the receptacle electrical contacts and the head electrical contacts 116. In some embodiments, the wires may be routed to the head 38 outside of the center column 30.

As illustrated in FIGS. 2-5, the accessory device 200 may be selectively and interchangeably coupled (i.e., directly coupled) to the tripod 14 or a battery pack (e.g., battery pack 300). The accessory device 200 may include an upper portion 204 and a lower portion 208. The lower portion 208 may include a device surface 212. The device surface 212 may have device mounting features 216 and device electrical contacts 220. In some embodiments, the device electrical contacts 220 may be positioned on the device mounting features 216. In some embodiments, the device electrical contacts 220 may be positioned elsewhere on the device surface 212. The device mounting features 216 can be, but do not have to be, an inverse of the head mounting features 112. For example, the illustrated head mounting feature 112 may include a cylindrical projection, while the illustrated device mounting feature 216 may include a cylindrical recess that receives the cylindrical projection. In some embodiments, the head mounting feature 112 and the device mounting feature 216 may have other shapes (e.g., square, rectangular, hexagonal, D-shaped, oblong, etc.). Additionally, or alternatively, the device mounting feature 216 may include a projection, while the head mounting feature 112 may include a recess that receives the projection. The device electrical contacts 220 may physically and/or electrically couple to the head electrical contacts 116 when the accessory device 200 is supported on the head 38.

In the illustrated embodiment, the device surface 212 may further include secondary mounting features 221 and secondary electrical contacts 222 configured to engage the battery pack 300. The secondary mounting features 221 and the secondary electrical contacts 222 may be spaced apart from the device mounting features 216 and the device electrical contacts 220. The secondary mounting features 221 may be similar to or the same as the receptacle mounting features of the battery receptacle 62 (FIG. 1). The secondary electrical contacts 222 may be similar to or the same as the receptacle electrical contacts of the battery receptacle 62. Both the device electrical contacts 220 and the secondary electrical contacts 222 are in selective electrical communication with the upper portion 204 of the accessory device 200. In some embodiments, such as the embodiment illustrated in FIG. 33 and described below, only one set of electrical contacts and mounting features may be provided, the one set configured to selectively engage either of the battery pack 300 or the head 38.

The lower portion 208 of the accessory device 200 may also include a device latch portion 224. The device latch portion 224 may be formed as a pair of ridges or shelves on or adjacent opposite sides of the device surface 212. The device latch portion 224 may be configured to be engaged by the two head latches 108 to selectively secure the accessory device 200 on the head 38.

The illustrated accessory device 200 may include the upper portion 204 formed as a light head or luminaire 228. The luminaire 228 may include a housing 232, a light source 236, and an optic 240. The light source 236 may be positioned within the housing 232. In the illustrated embodiment, the light source 236 may include one or more LEDs. More particularly, the light source 236 may include an array of LEDs positioned on a circuit board and/or heat sink. In some embodiments, the light source 236 may include other suitable light-emitting elements, such as an incandescent or halogen light source. The optic 240 may be a lens that is coupled to the housing 232 and covers the light source 236. The accessory device 200 may also include a power switch. The power switch may be operable to turn the light source 236 on and off. The power switch may also change operating modes of the light source (e.g., high, medium, low, flashing, etc.).

Some embodiments of the accessory device, such as those shown in FIGS. 9-32, may include upper portions 204 formed as different types of devices configured to perform different tasks as discussed later in the specification. Each embodiment of the accessory device may be interchangeable and may include the same device mounting features 216 and device electrical contacts 220 as well as the same secondary mounting features 221 and secondary electrical contacts 222, where secondary features are provided.

Figure 6:
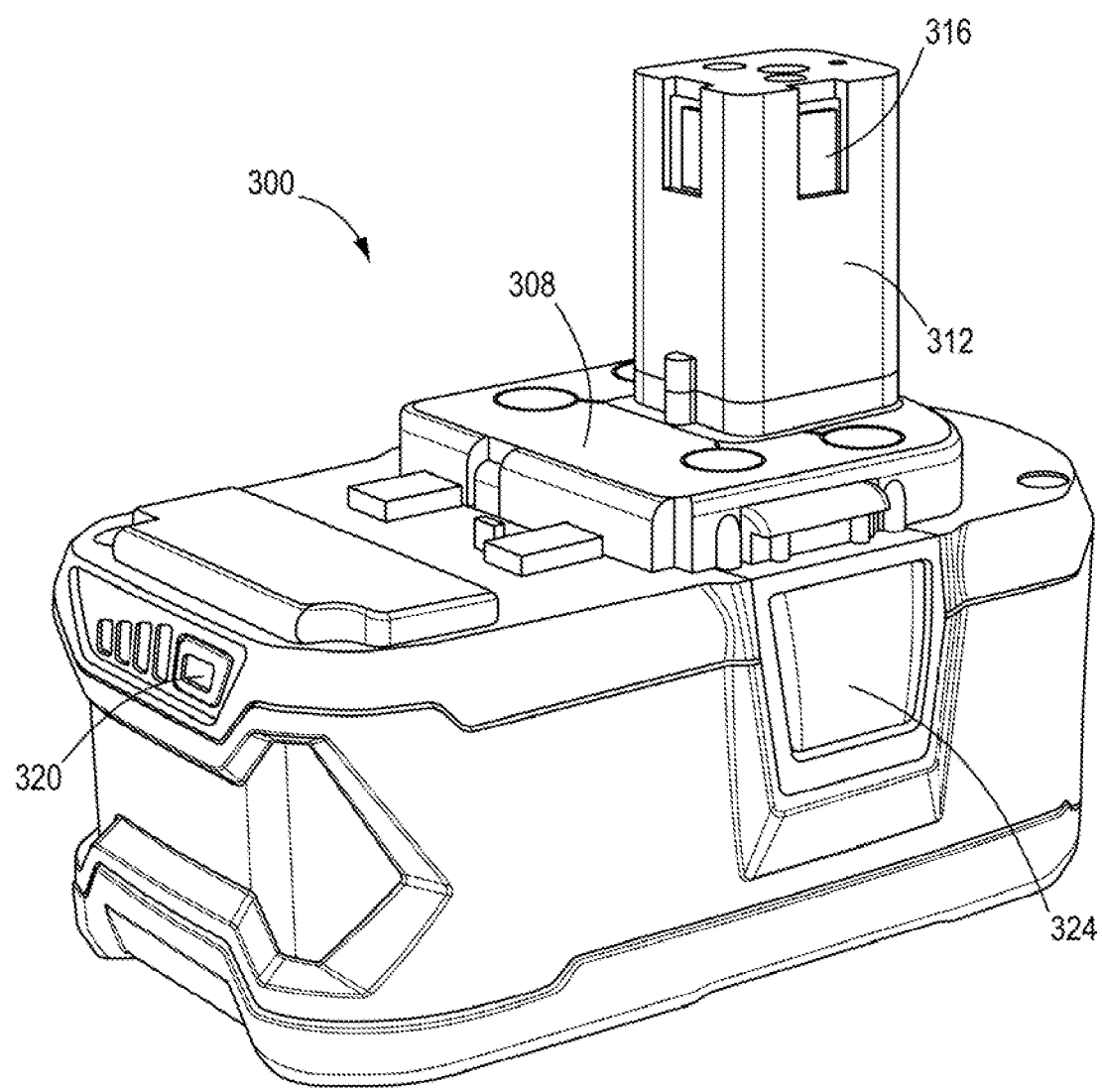
FIG. 6 is a perspective view of the battery pack of FIG. 1.
Figure 7:
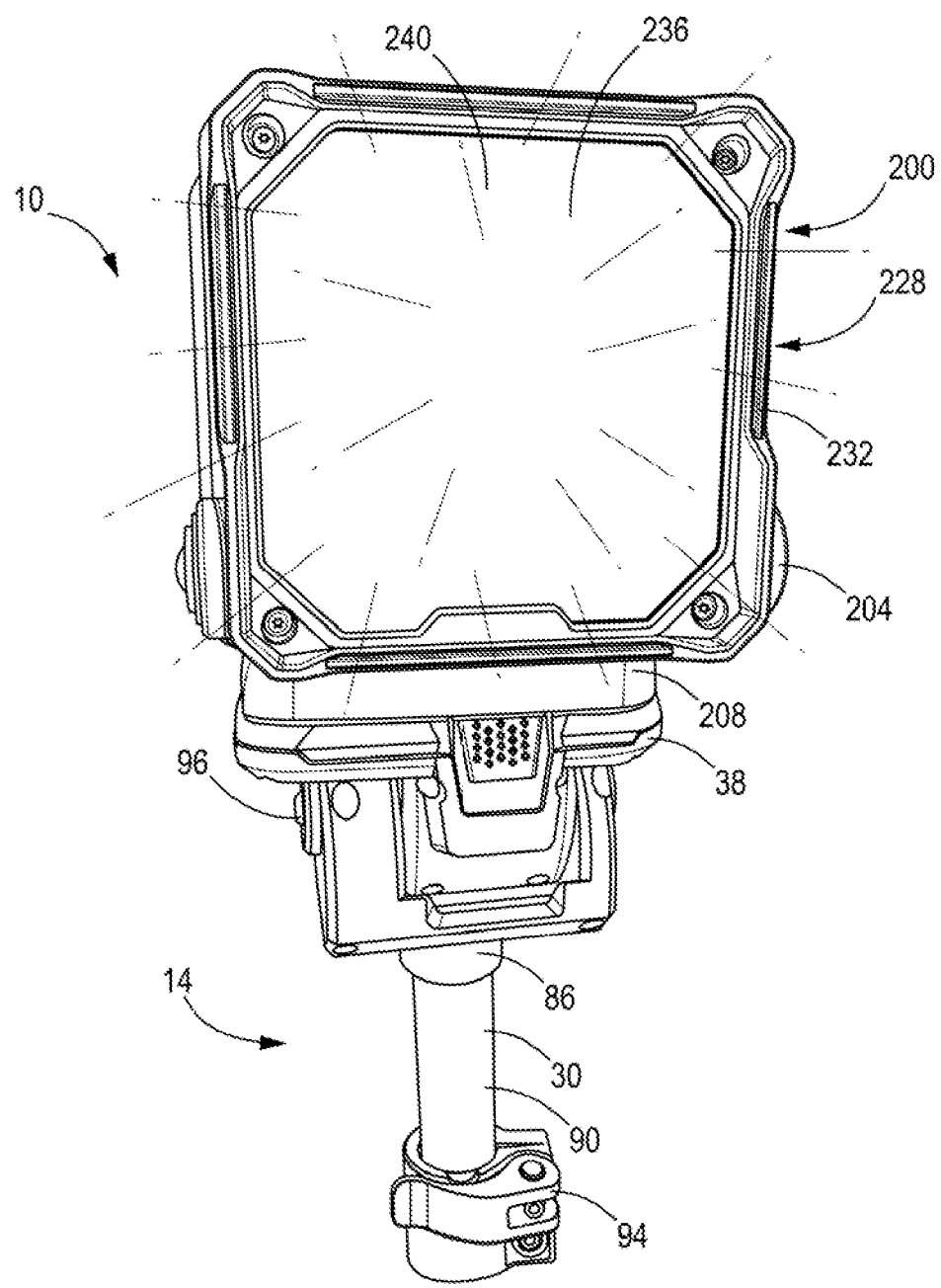
FIG. 7 is a front view of a portion of the tripod system of FIG. 1 with the accessory device in a powered state.

With reference to FIG. 6, the battery pack 300 may be alternately coupled to the tripod 14 or to the accessory device 200. In the illustrated embodiment, the battery pack 300 may be a power tool battery pack. That is, the battery pack 300 may also be configured to be interchangeably used with different types of power tools. In some embodiments, the battery pack 300 may be an 18-volt Li-ion battery pack. In some embodiments, the battery pack 300 may have other voltages and/or chemistries. The battery pack 300 may include a bank of power cells and a battery surface 308 including battery mounting features 312 and battery electrical contacts 316. In some embodiments, the battery electrical contacts 316 may be positioned on the battery mounting features 312. In some embodiments, the battery electrical contacts 316 may be positioned elsewhere on the battery surface 308. In the illustrated embodiment, the battery mounting features 312 may be the inverse of the secondary mounting features 221 of the accessory device 200. For example, the illustrated secondary mounting features 221 may include a D-shaped channel, while the illustrated battery mounting features 312 may include a D-shaped stem. The battery electrical contacts 316 may couple to the secondary electrical contacts 222 when the accessory device 200 is supported on the battery pack 300. In some embodiments, the battery mounting features 312 may be the inverse of the device mounting features 216 of the accessory device 200 and the battery electrical contacts 316 may couple to the device electrical contacts 220. The battery pack 300 may further include a charge switch 320 operable to identify a remaining amount of charge in the battery pack 300. The battery pack 300 may also include a battery latch 324 that may be similar to or the same as the head latch 108. In some embodiments, the battery pack 300 may include two battery latches 324 positioned on opposing sides of the battery surface 308.

In a first mode of use, illustrated in FIGS. 1-4 and 7, the system 10 may be assembled in a first assembly state by positioning the battery pack 300 within the battery receptacle 62. To do so, the battery surface 308 may be positioned adjacent the receptacle surface, and the battery mounting features 312 and the receptacle mounting features may align to allow coupling of the battery electrical contacts 316 and the receptacle electrical contacts. The battery latch(es) 324 may engage the receptacle latch portion(s) in order to retain the battery pack 300 in the battery receptacle 62.

The accessory device 200 may be positioned atop the head 38. To do so, the device surface 212 may be positioned adjacent the head surface 104 such that the device mounting features 216 and the head mounting features 112 align to allow coupling between the head electrical contacts 116 and the device electrical contacts 220. In the illustrated embodiment, while the accessory device 200 is supported by the tripod 14, the secondary mounting features 221 and secondary electrical contacts 222 may be blocked such that another battery pack or another tripod is prevented from interfacing directly with the accessory device 200.

Once the system 10 has been assembled in the first assembly state, the system 10 may be operated. Power may be transmitted through the connection with the receptacle electrical contacts, through the tripod electrical system, and to the head electrical contacts 116 which are in electrical communication with the device electrical contacts 220. The device power switch may then be activated to the desired mode allowing the device electrical contacts 220 to provide power to the upper portion 204 of the accessory device 200. In the illustrated embodiment, power may be provided to the luminaire 228 and specifically to the light source 236 causing light to be projected in a forward direction. The angle of the accessory device 200 and the luminaire 228 may be altered by pivoting the head 38 about the pivot axis 100. The length of the center column 30 may be adjusted in order to position the head 38 and accessory device 200 at a desired height. The center column 30 may also be used to adjust the rotational position of the accessory device, thereby adjusting the forward direction of the luminaire.

To disassemble the system 10, the accessory device 200 may be removed by depressing the head latch(es) 108 and disengaging the device mounting features 216 and the head mounting features 112, thereby uncoupling the device electrical contacts 220 and the head electrical contacts 116. The battery pack 300 may then be removed by depressing the battery latch(es) 324 and disengaging the battery mounting features 312 and the receptacle mounting features, thereby uncoupling the battery electrical contacts 316 and the receptacle electrical contacts.

Figure 8:
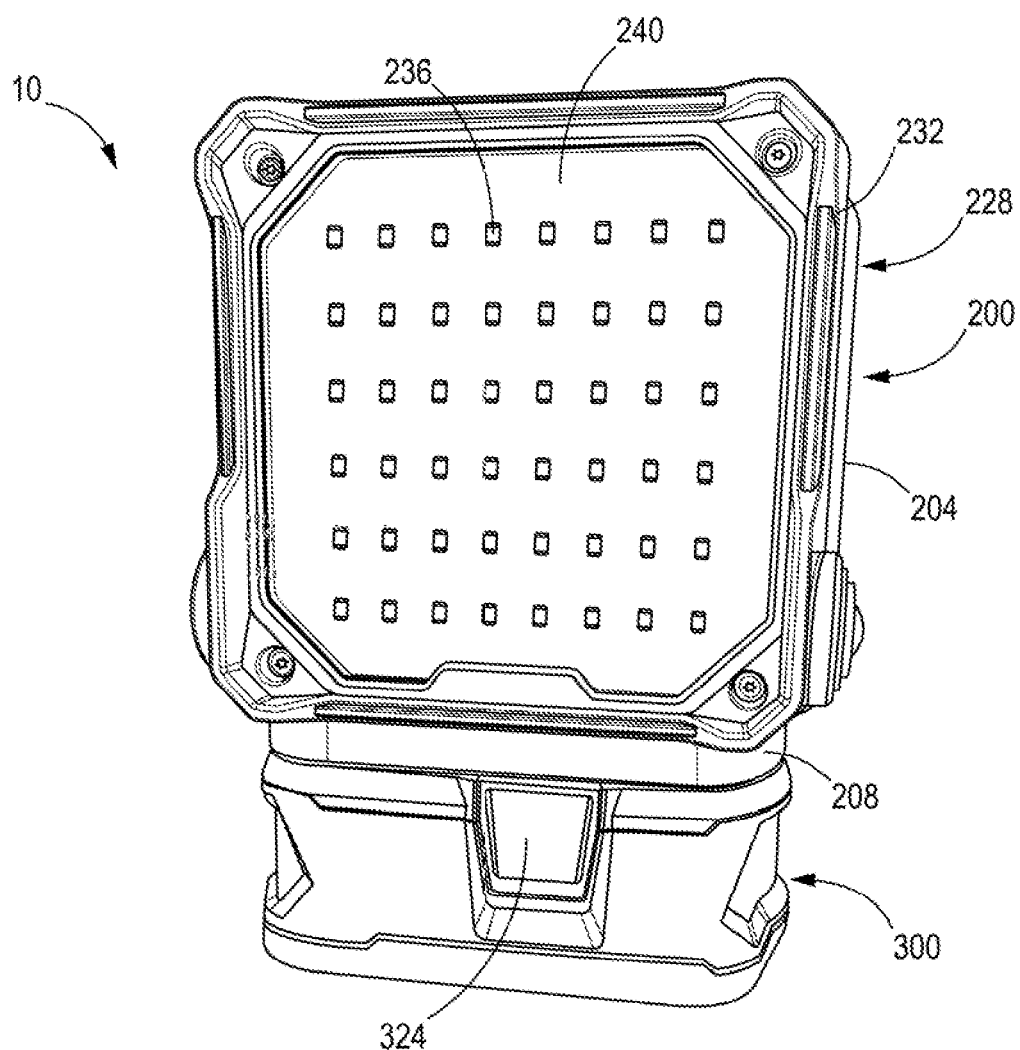
FIG. 8 is a front view of the battery pack and the accessory device of FIG. 1 in a second assembly state.

In a second mode of use, as shown in FIG. 8, the system 10 may be assembled into a second assembly state by omitting the tripod 14 and coupling the battery pack 300 directly with the accessory device 200. The battery surface 308 may be disposed adjacent the device surface 212. In the illustrated embodiment, the battery mounting features 312 may be aligned with the secondary mounting features 221 to couple the battery electrical contacts 316 with the secondary electrical contacts 222 and to provide electrical communication therebetween. In some embodiments, the battery mounting features 312 may be aligned with the device mounting features 216 to couple the battery electrical contacts 316 with the device electrical contacts 220. The battery latch(es) 324 may engage the device latch portion 224 which allows the battery pack 300 to be retained adjacent the accessory device 200. While the accessory device 200 is coupled to the battery pack 300, the device mounting features 216 and device electrical contacts 220 may be blocked such that the tripod 14 or another battery pack is prevented from interfacing directly with the accessory device 200.

In operation, the battery pack 300 may be activated, allowing the power cells to provide power to the battery electrical contacts 316 which are in electrical communication with the secondary electrical contacts 222. The device power switch may be activated to the desired mode to allow the secondary electrical contacts 222 to provide power to the upper portion 204. In the illustrated embodiment, power may be provided to the luminaire 228, specifically to the light source 236, so that light may be projected in a forward direction. The light may be adjusted by manually moving the system 10. The system 10 may be placed directly on the ground, on a tabletop, or on another flat surface. The system 10 may therefore be portable and handheld. To disassemble the system 10, the battery pack 300 may be uncoupled by depressing the battery latch(es) 324 and disengaging the battery mounting features 312 and the secondary mounting features 221, thereby uncoupling the battery electrical contacts 316 and the secondary electrical contacts 222.

Figure 9:
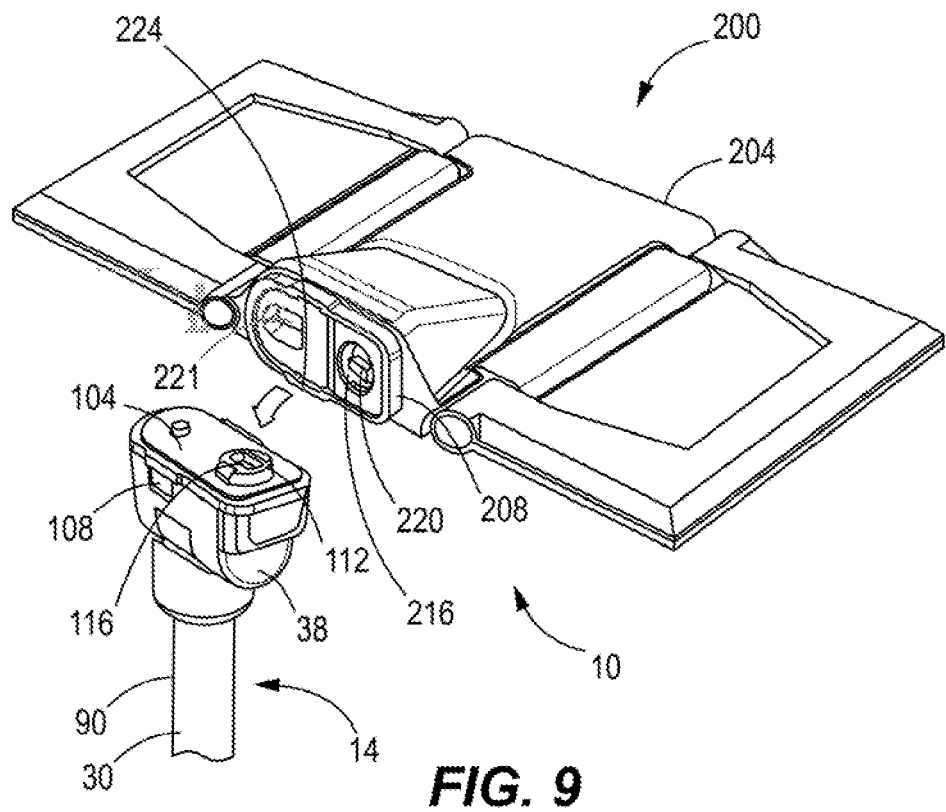
FIG. 9 is a rear perspective view of a tripod system including the tripod of FIG. 1 with a first embodiment of a mounting surface and a second embodiment of an accessory device.
Figure 10:
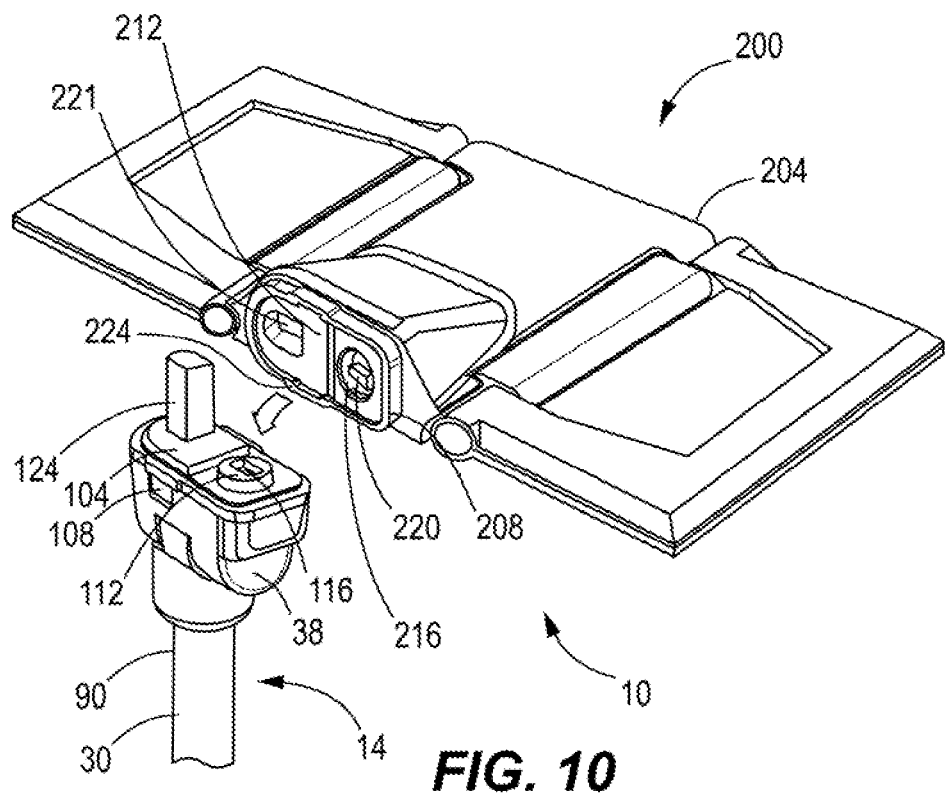
FIG. 10 is a rear perspective view of a tripod system including a tripod with a second embodiment of a mounting surface and the accessory device of FIG. 8.
Figure 11:
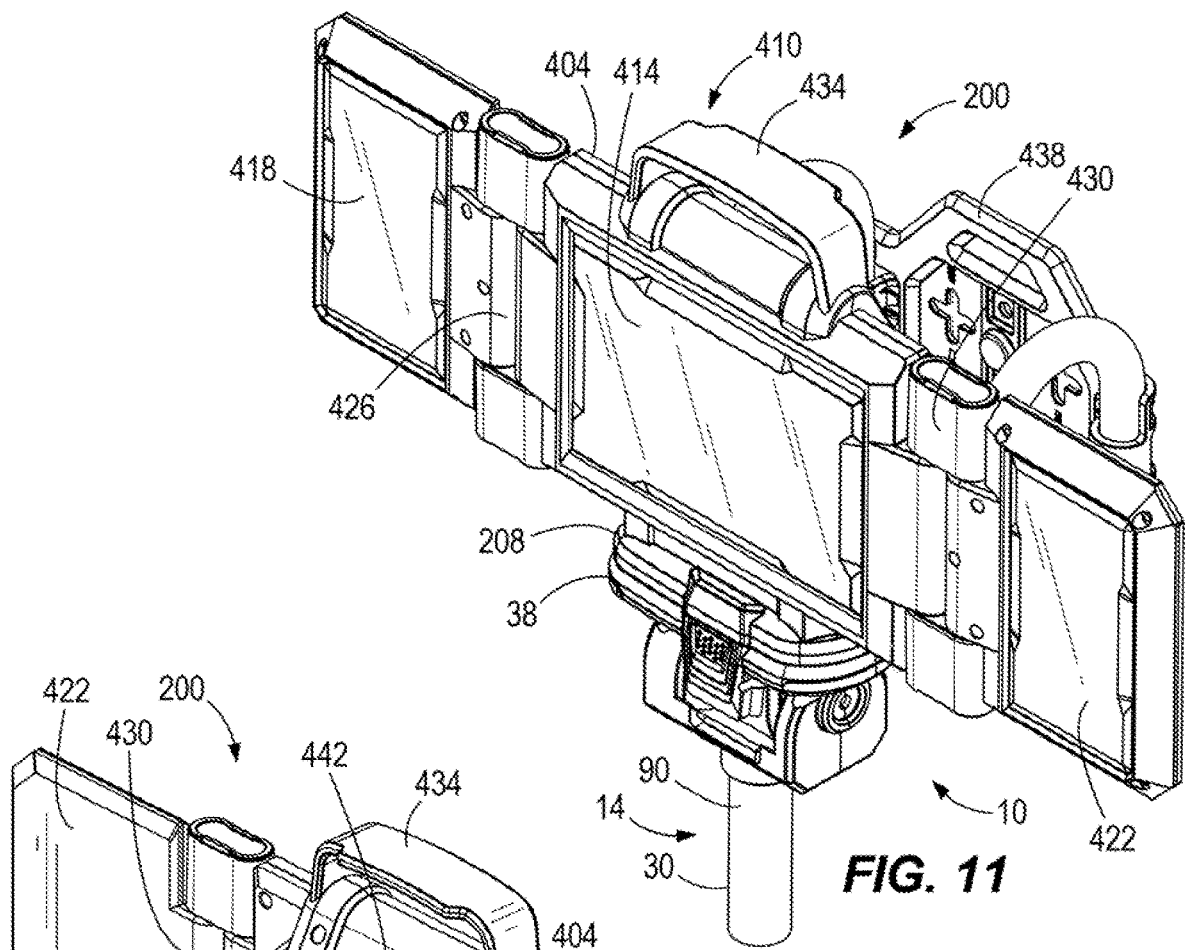
FIG. 11 is a front perspective view of a tripod system including the second embodiment of the accessory device.
Figure 12:
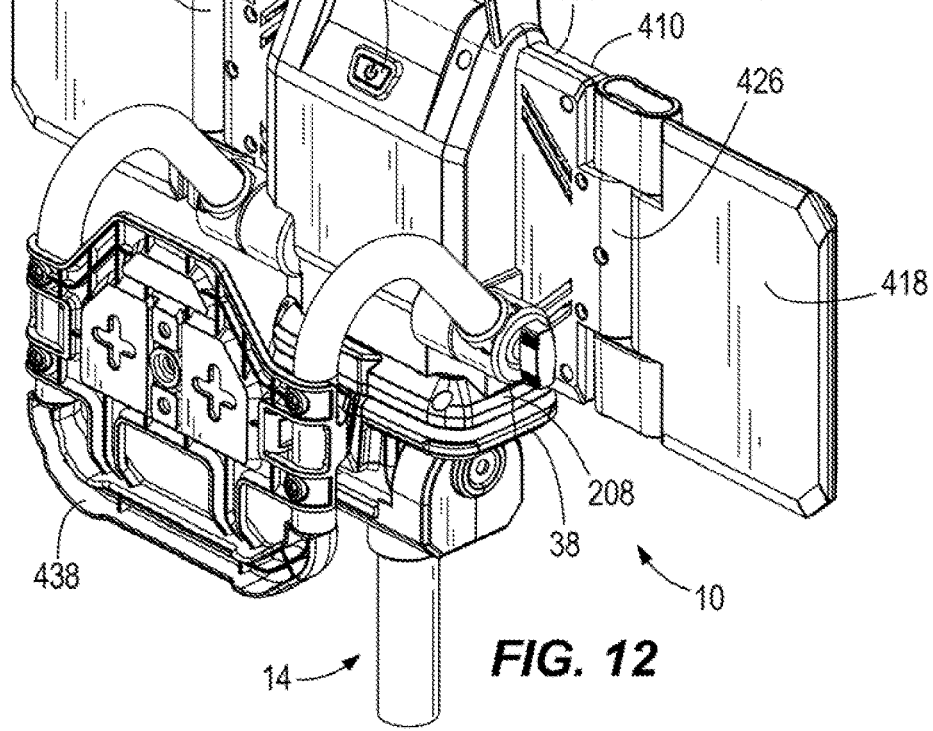
FIG. 12 is a rear perspective view of the tripod system of FIG. 10.
Figure 13:
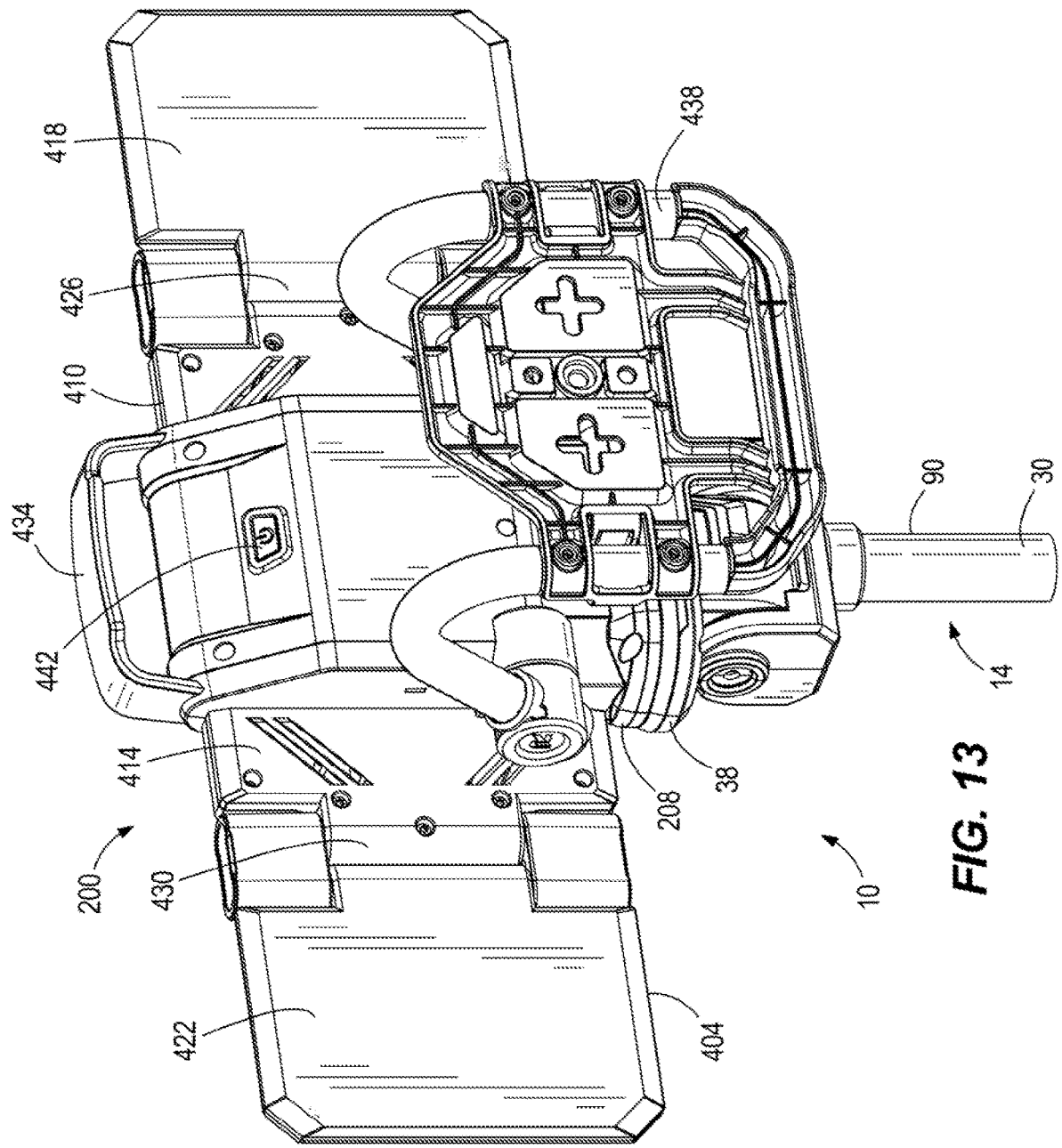
FIG. 13 is a rear view of the tripod system of FIG. 10.

Referring to FIGS. 9 and 10, two embodiments of the head surface 104 are shown. FIG. 9 illustrates the head surface 104 including the head mounting features 112 that are similar to the features as shown in FIG. 5. In some embodiments, as illustrated in FIG. 10, the head surface 104 may include a secondary head mounting feature 124. The secondary head mounting feature 124 may interface with the secondary mounting feature 221 of the accessory device 200. The illustrated secondary head mounting feature 124 may include a D-shaped stem, while the illustrated secondary mounting features 221 may include a D-shaped channel. The secondary head mounting feature 124 may be purely mechanical and may not include electrical contacts.

FIGS. 11-16 illustrates the accessory device 200 including a second embodiment of an upper portion 404. In the illustrated embodiment, the upper portion 404 may include a three-panel luminaire 410. The luminaire 410 may include a center panel 414, a left panel 418, and a right panel 422. The left panel 418 may be connected to the center panel 414 by a left hinge 426 which allows the left panel 418 to be rotated relative to the center panel 414. The right panel 422 may be similarly connected to the center panel by a right hinge 430 which allows for rotation relative to the center panel 414. The luminaire 410 may further include a handle 434 for convenient carrying. A support structure 438 may also be coupled to the center panel 414. The support structure 438 may be a stand that allows the luminaire 410 to be self-supporting. The support structure 438 may also be pivotally coupled to the center panel 414. As such, the support structure 438 may pivot out of the way to allow the luminaire 410 to connect to the tripod 14. The luminaire 410 may include a power button 442 to control operation of the luminaire 410.

Figure 14:
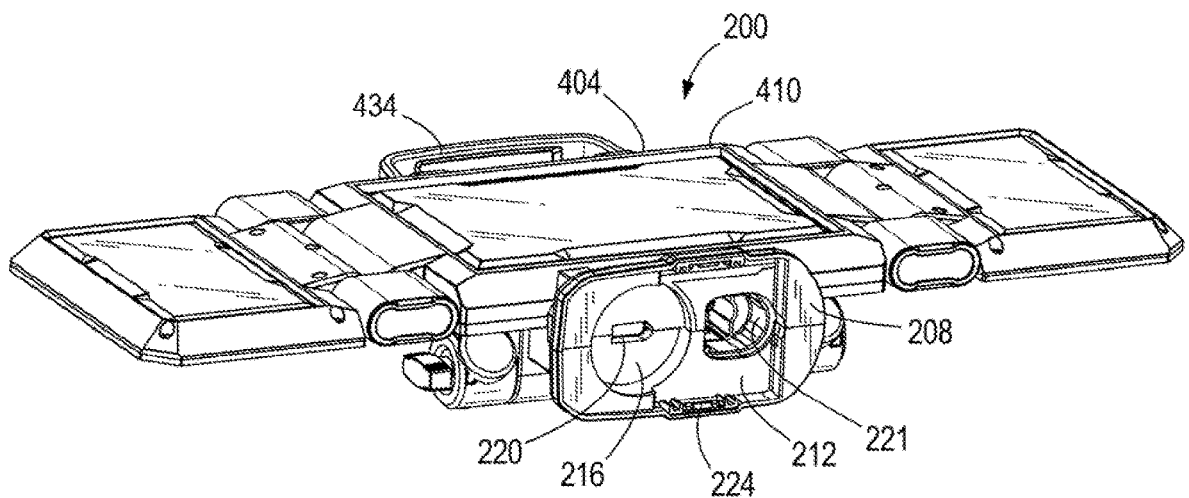
FIG. 14 is a bottom perspective view of the accessory device of FIG. 10.
Figure 15:
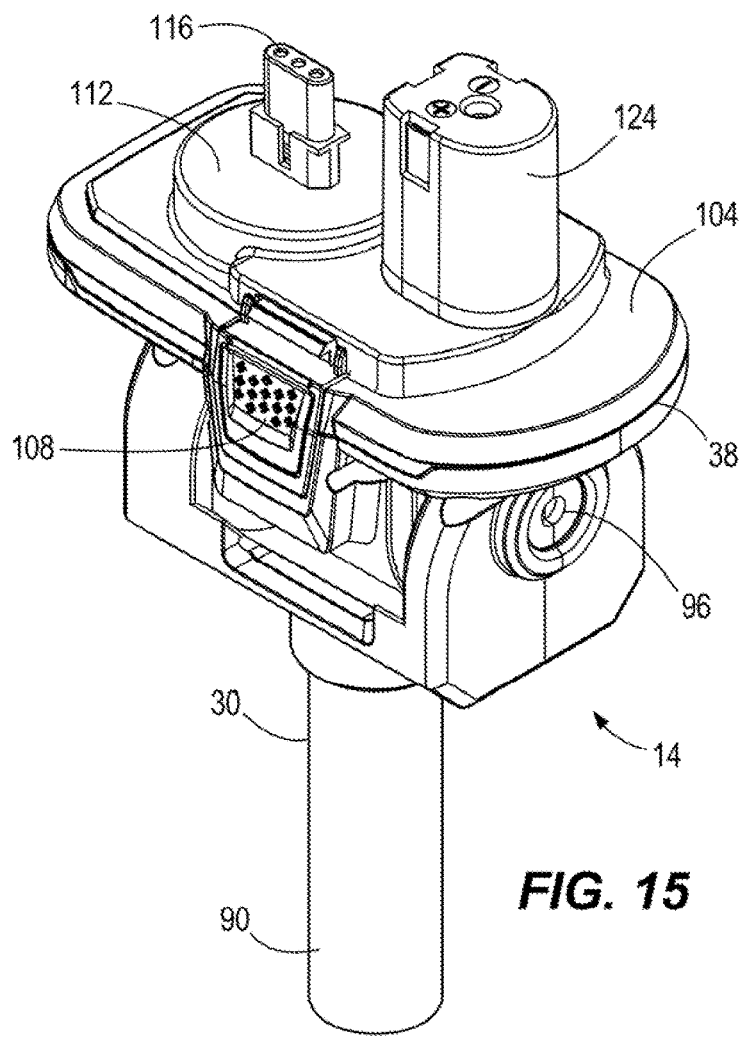
FIG. 15 is a perspective view of a portion of the tripod of FIG. 10.

FIGS. 14-15 illustrate the device surface 212 and the head surface 104 of the tripod 14 including the head electrical contacts 116. In the illustrated embodiment, the head electrical contacts 116 may be formed as a plug projection. In some embodiments, the head electrical contacts 116 may be formed or contained in other structures. In the illustrated embodiment, the device electrical contacts 220 may be formed as a socket. In some embodiments, the device electrical contacts 220 may be formed by or contained in other structures.

As mentioned above, the upper portion 404 of the accessory device 200 may take many forms. FIGS. 17-32 illustrate different embodiments of the upper portion of the accessory device. The various upper portions may be interchangeable on a battery and/or tripod for performing various different tasks.

Figure 17:
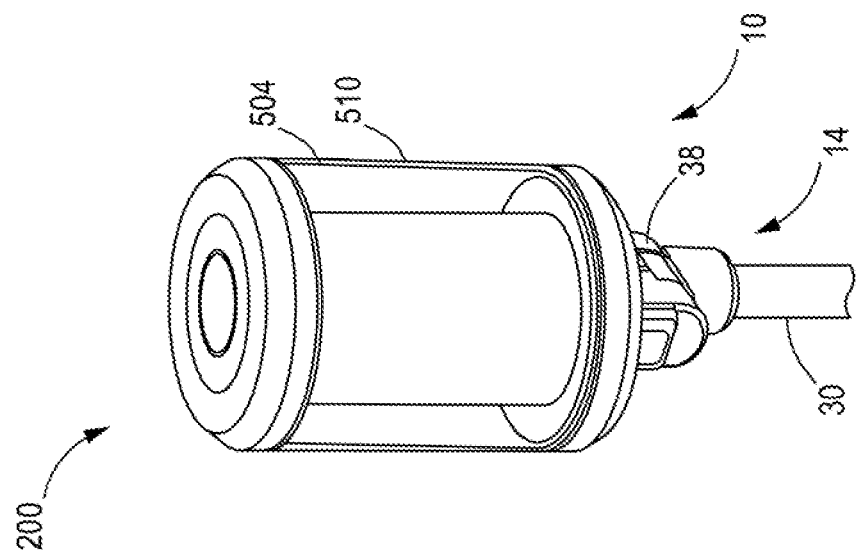
FIGS. 16-32 illustrate alternate embodiments of accessory devices connected to the tripod of FIG. 1.
Figure 16:
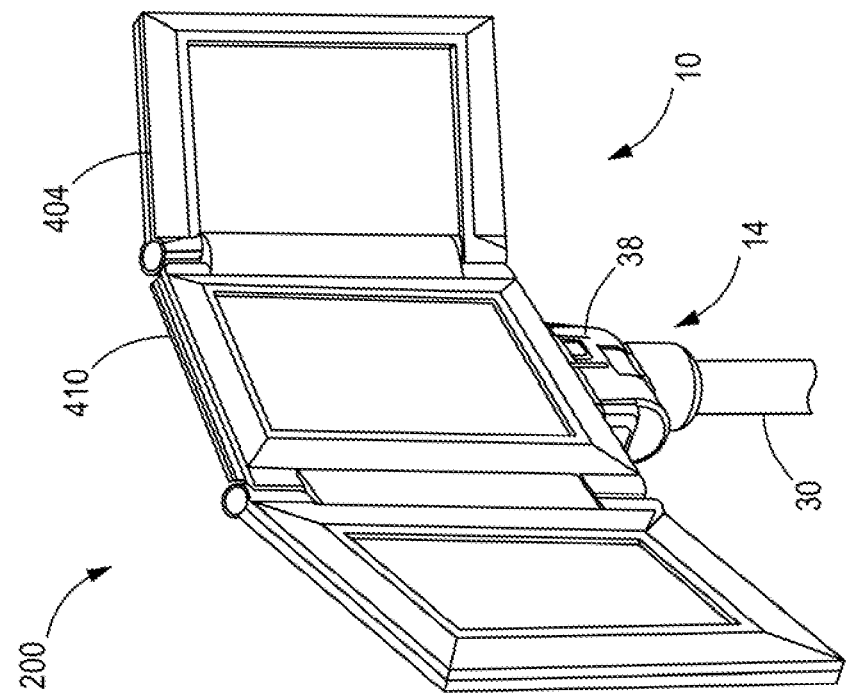
Figure 18:
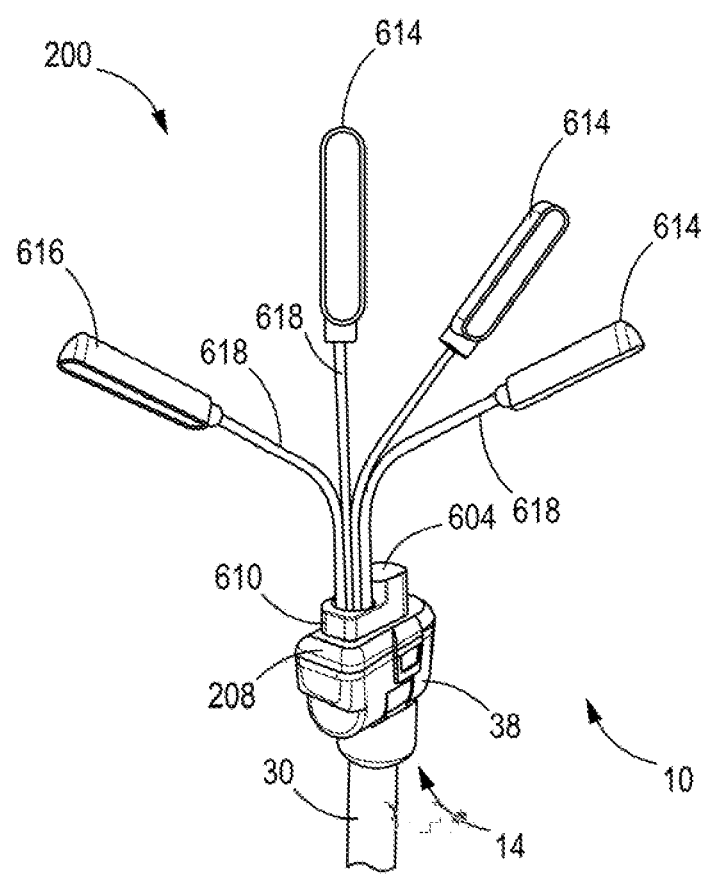

FIGS. 17-18 illustrate additional embodiments of an accessory device including luminaires. FIG. 17 shows an accessory device 200 where the upper portion 504 may be formed as a 360-degree luminaire 510. FIG. 18 illustrates an accessory device 200 where the upper portion 604 may be formed as a multi-task luminaire 610. The luminaire 610 may include a plurality of work lights 614 supported by flexible shafts 618.

Figure 20:
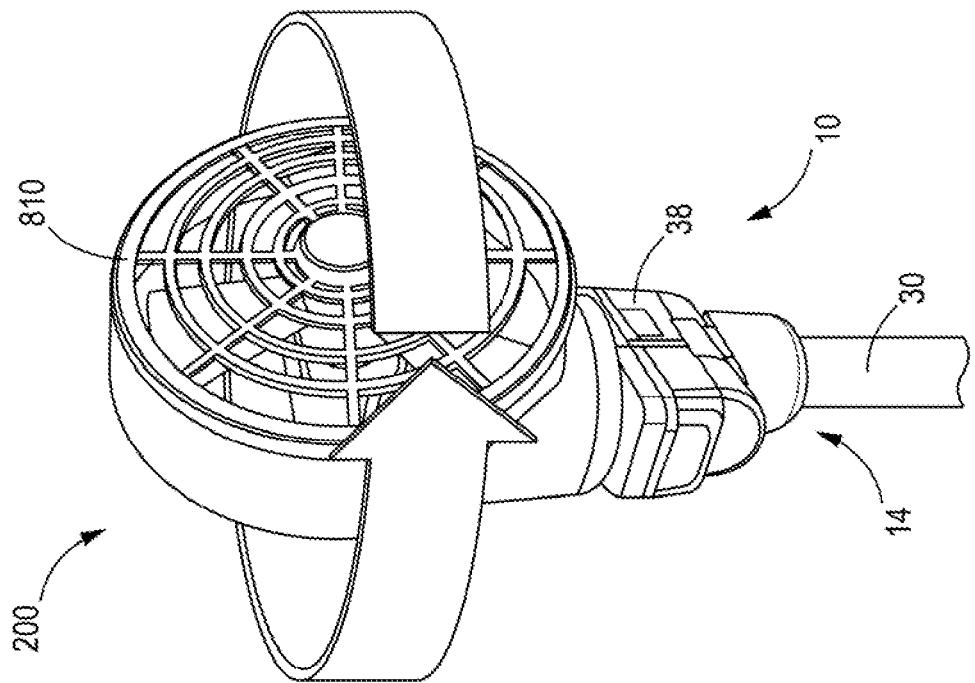
Figure 19:
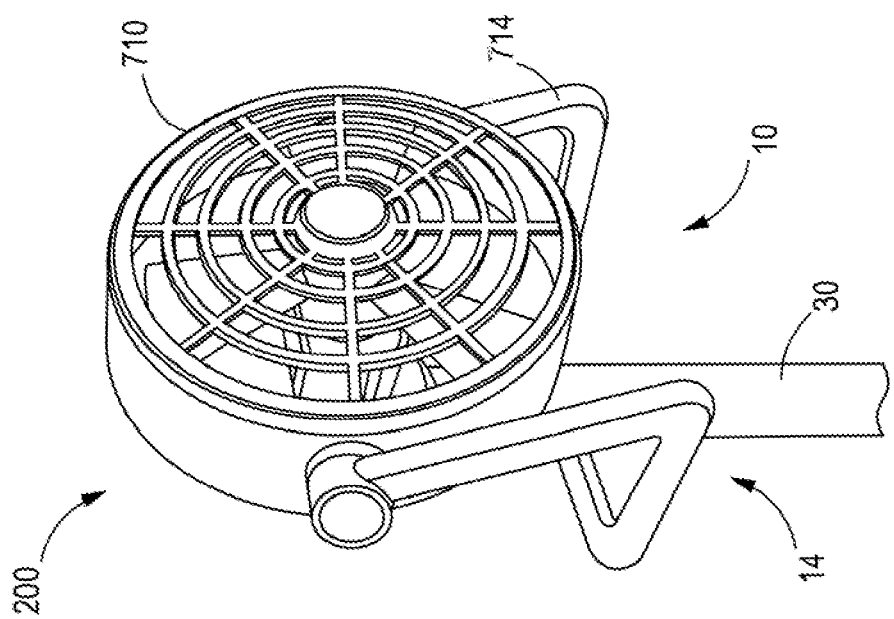
Figure 21:
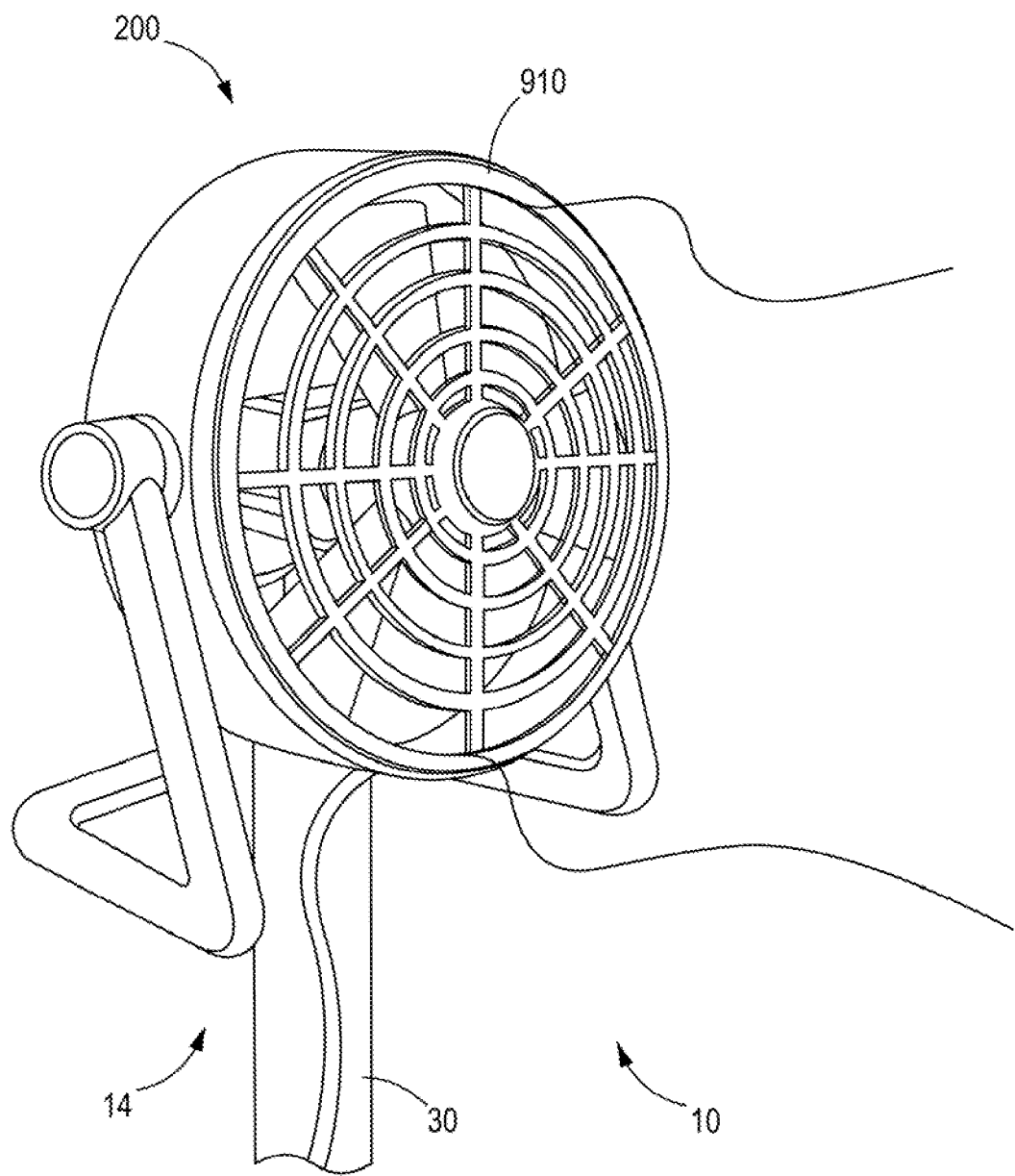
Figure 22:
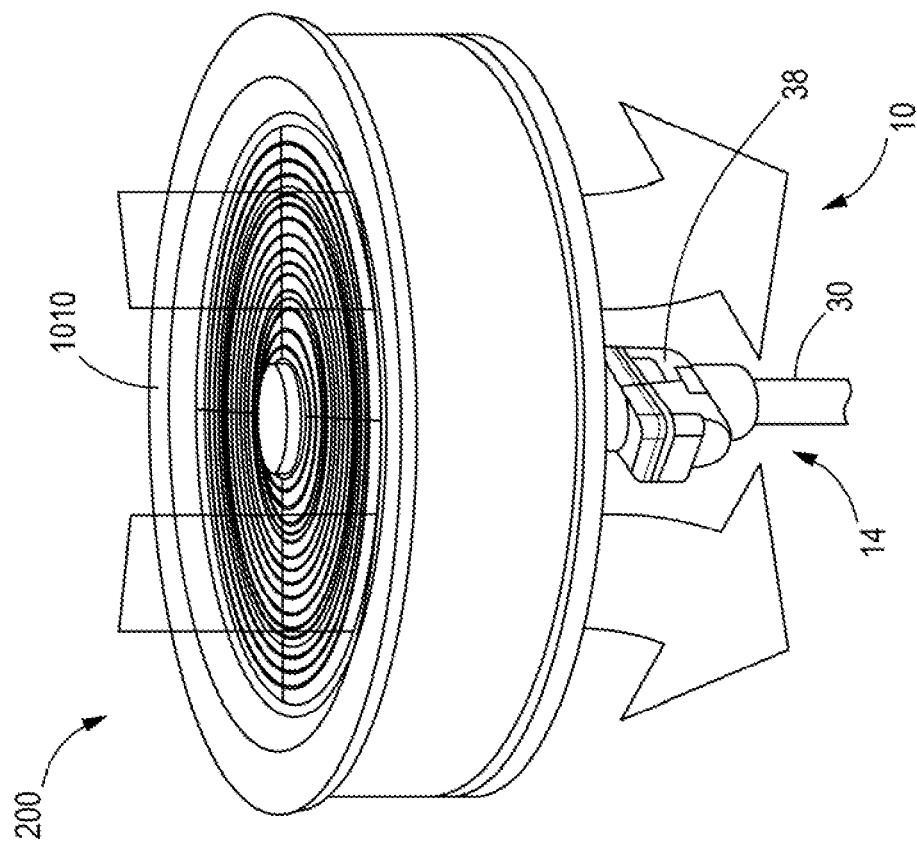

FIGS. 19-22 illustrate accessory devices 200 including upper portions formed as fans. FIG. 19 shows a centrifugal fan 710. The fan may include a handle 714 for easy positioning. FIG. 20 shows a 360-degree oscillating fan 810. FIG. 21 shows a misting fan 910. FIG. 22 shows a bladeless fan 1010.

Figure 23:
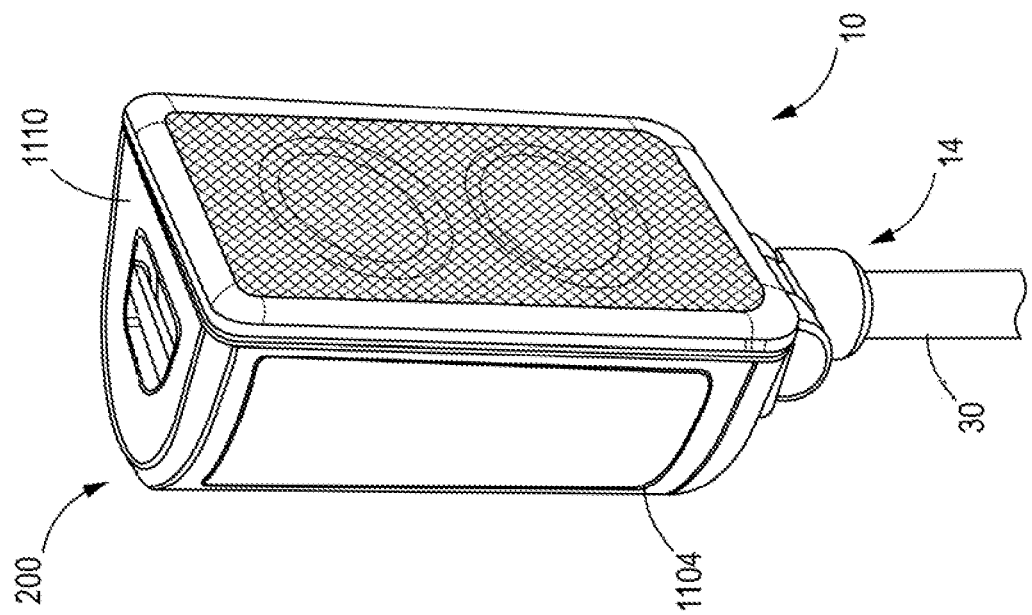

FIG. 23 illustrates an accessory device 200 including an upper portion 1104 formed as a speaker 1110.

Figure 24:
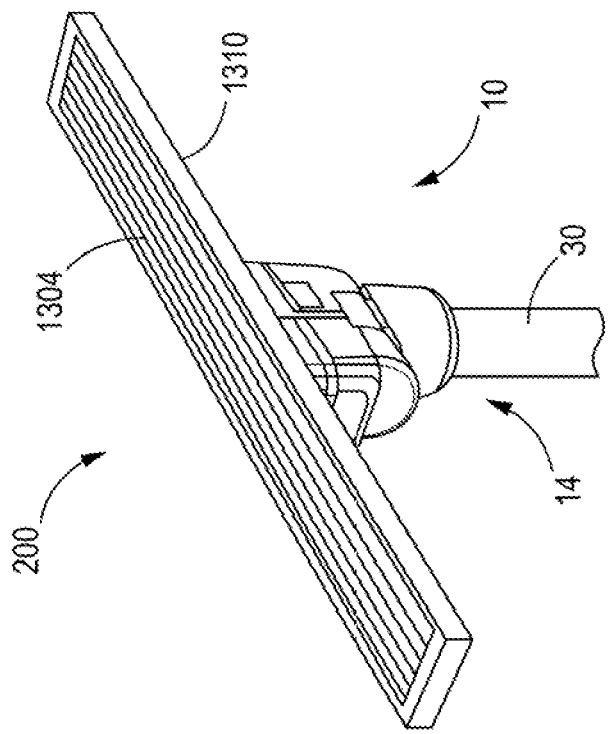

FIG. 24 illustrates an accessory device 200 including an upper portion 1204 formed as a laser level 1210.

Figure 25:
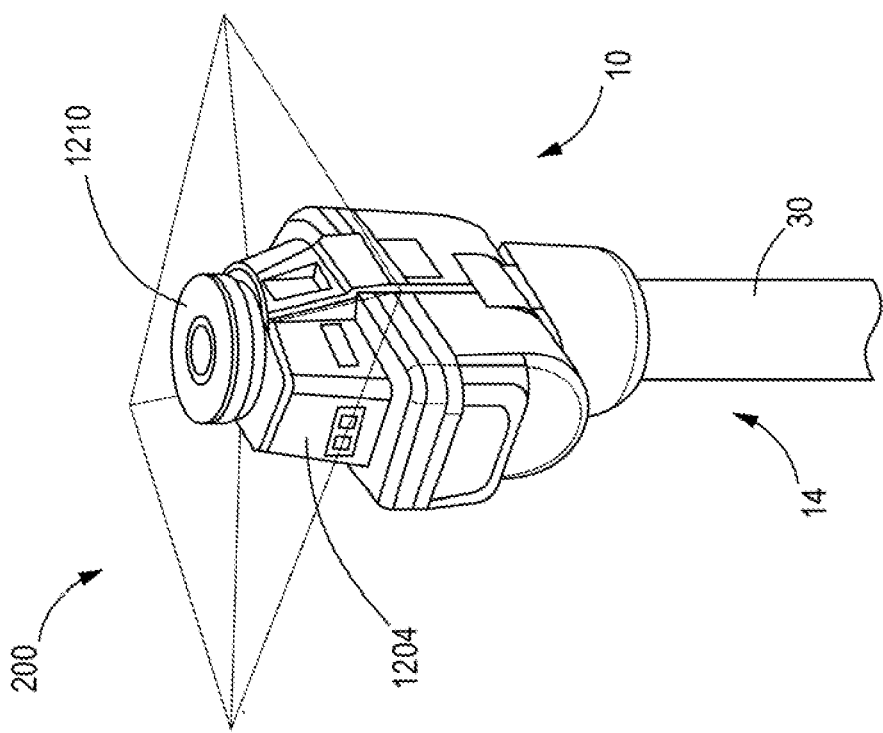
Figure 27:
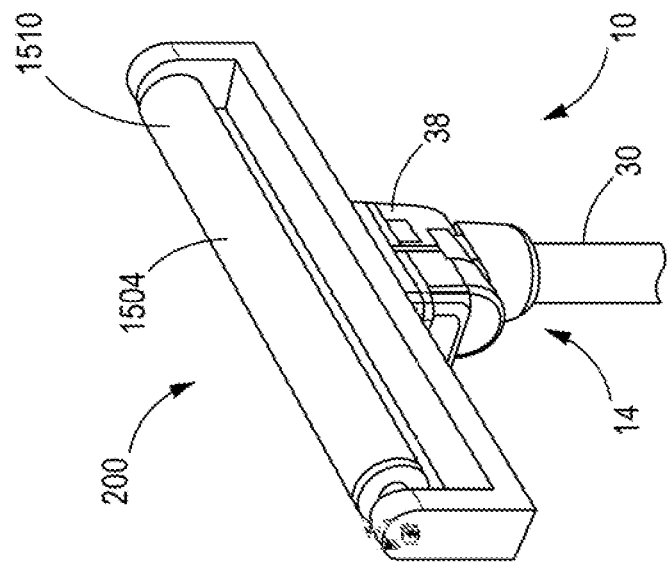
Figure 26:
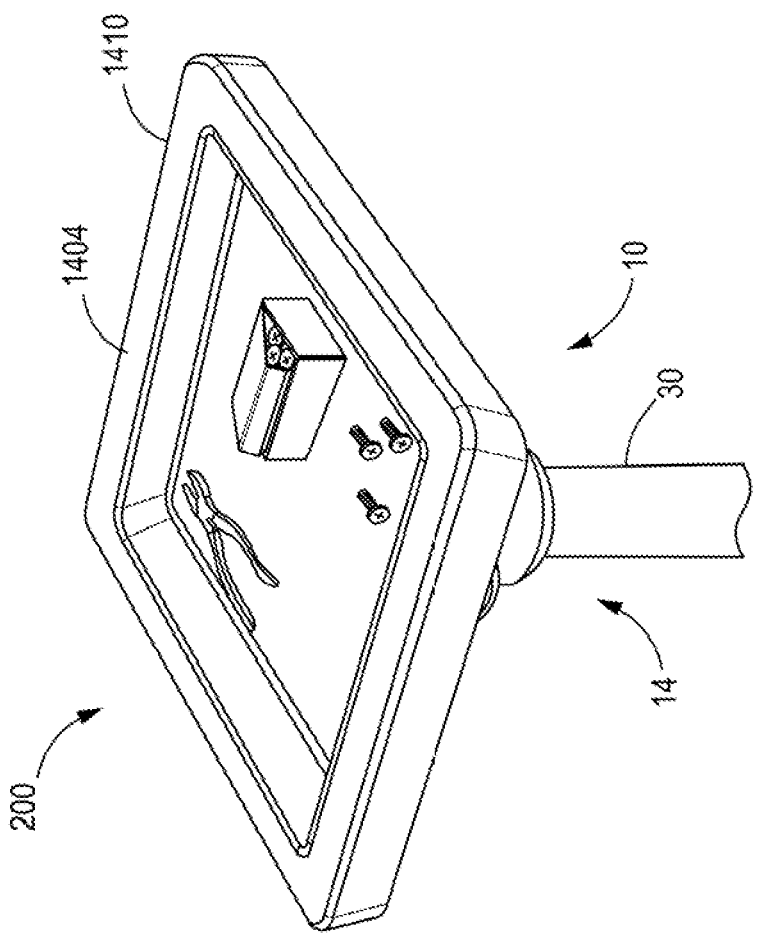

FIG. 25-27 illustrate accessory devices 200 including upper portions formed as non-electrical devices. FIG. 25 illustrates an accessory device 200 including an upper portion 1304 formed as a sawhorse 1310. The device electrical contacts 220 do not form a circuit to provide power to the sawhorse 1310. FIG. 26 illustrates an accessory device 200 including an upper portion 1404 formed as a tray 1410. FIG. 27 illustrates an accessory device 200 including an upper portion 1504 formed as an outfeed roller 1510.

Figure 28:
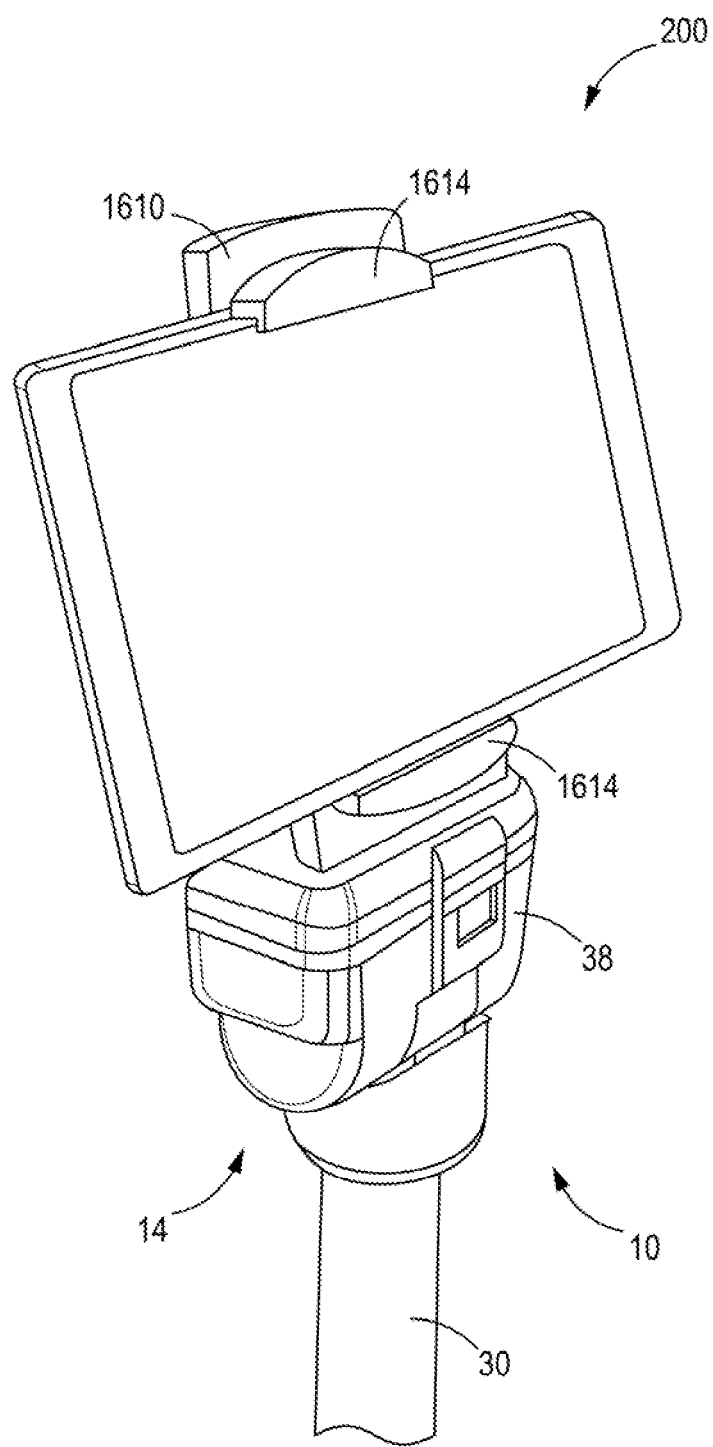
Figure 29:
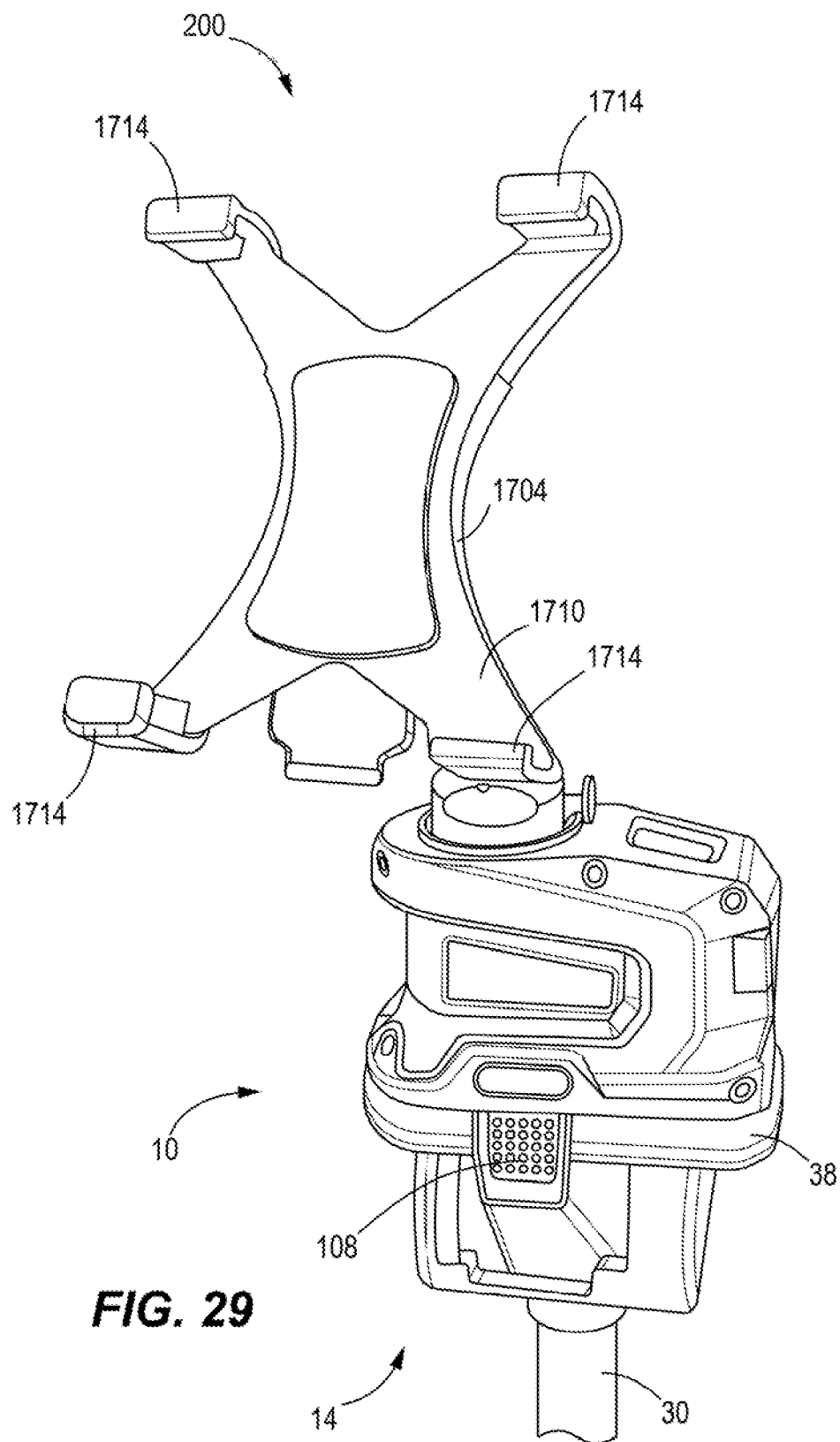
Figure 30:
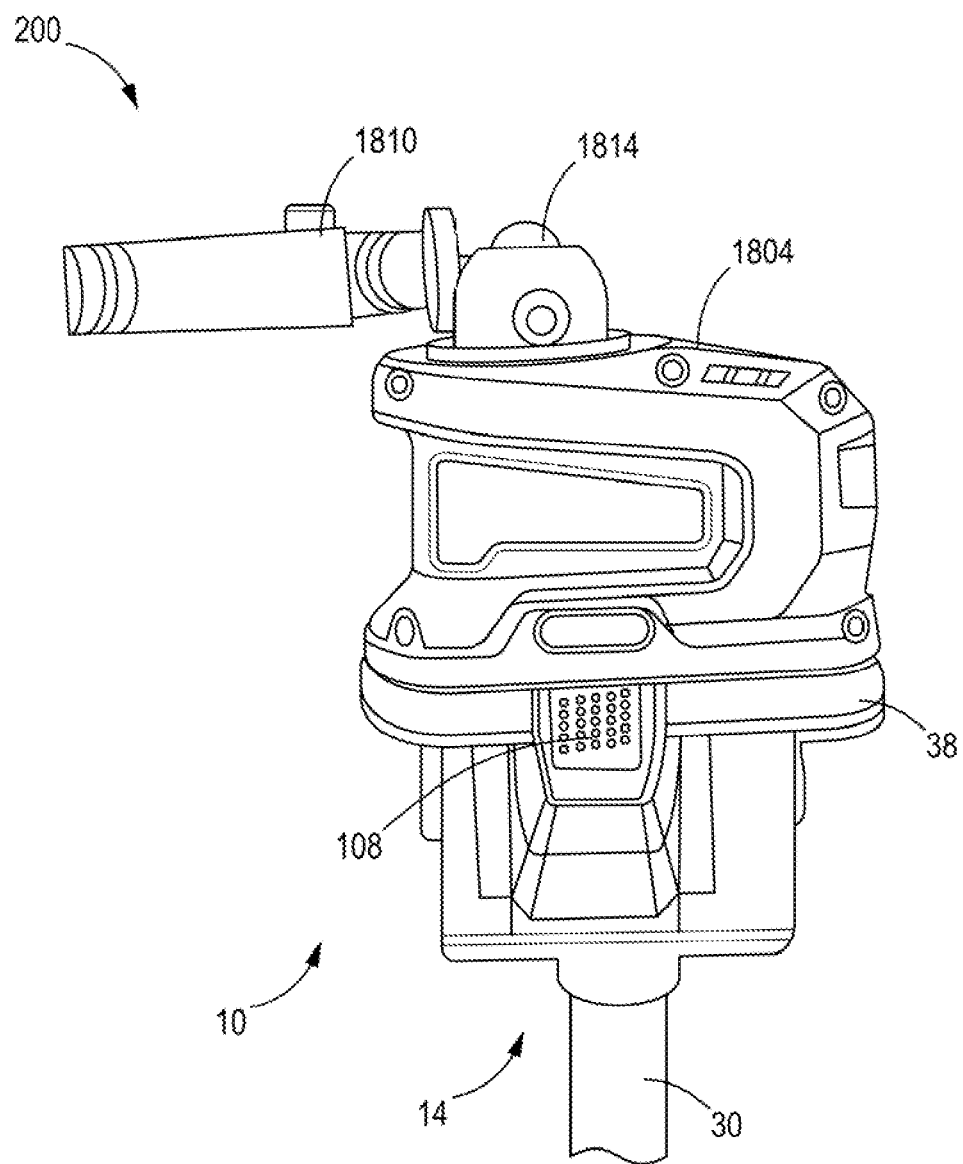
Figure 31:
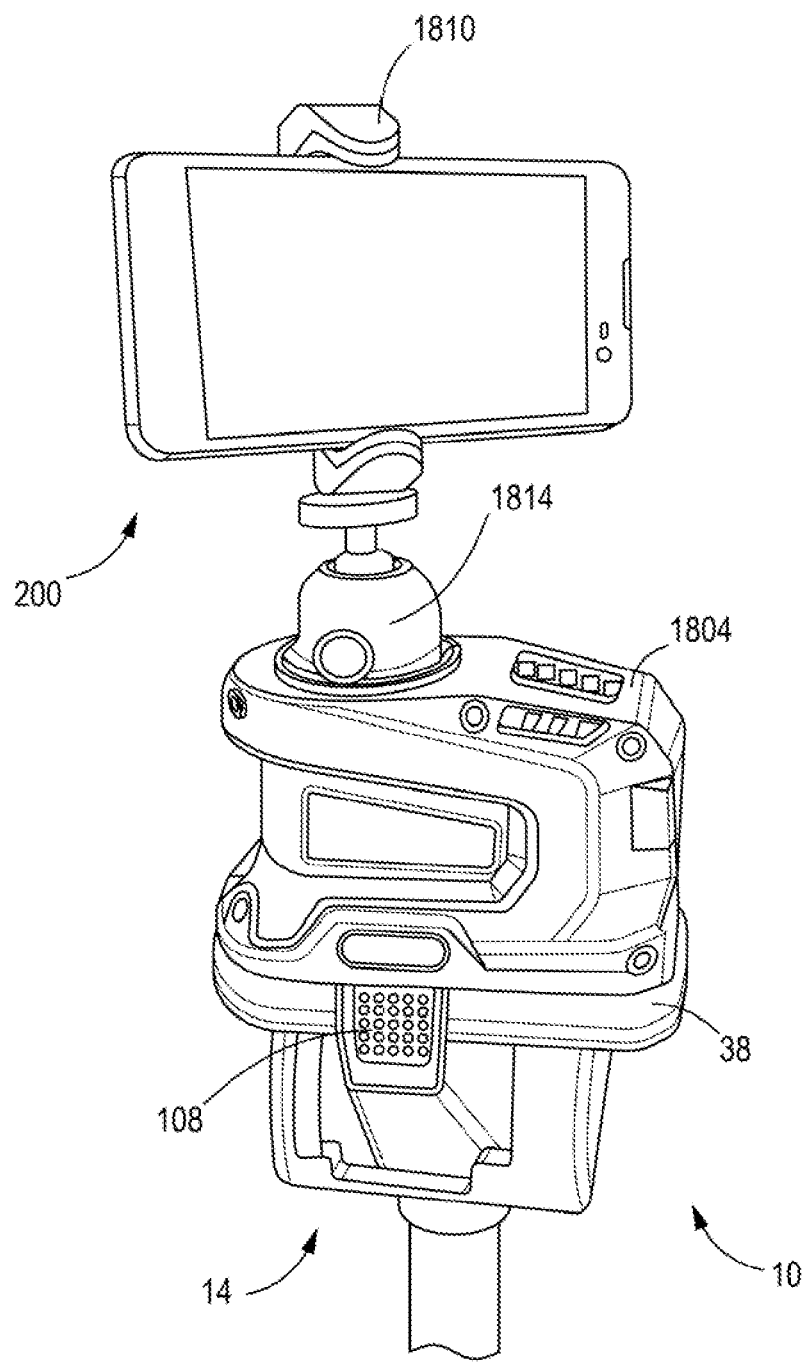
Figure 32:
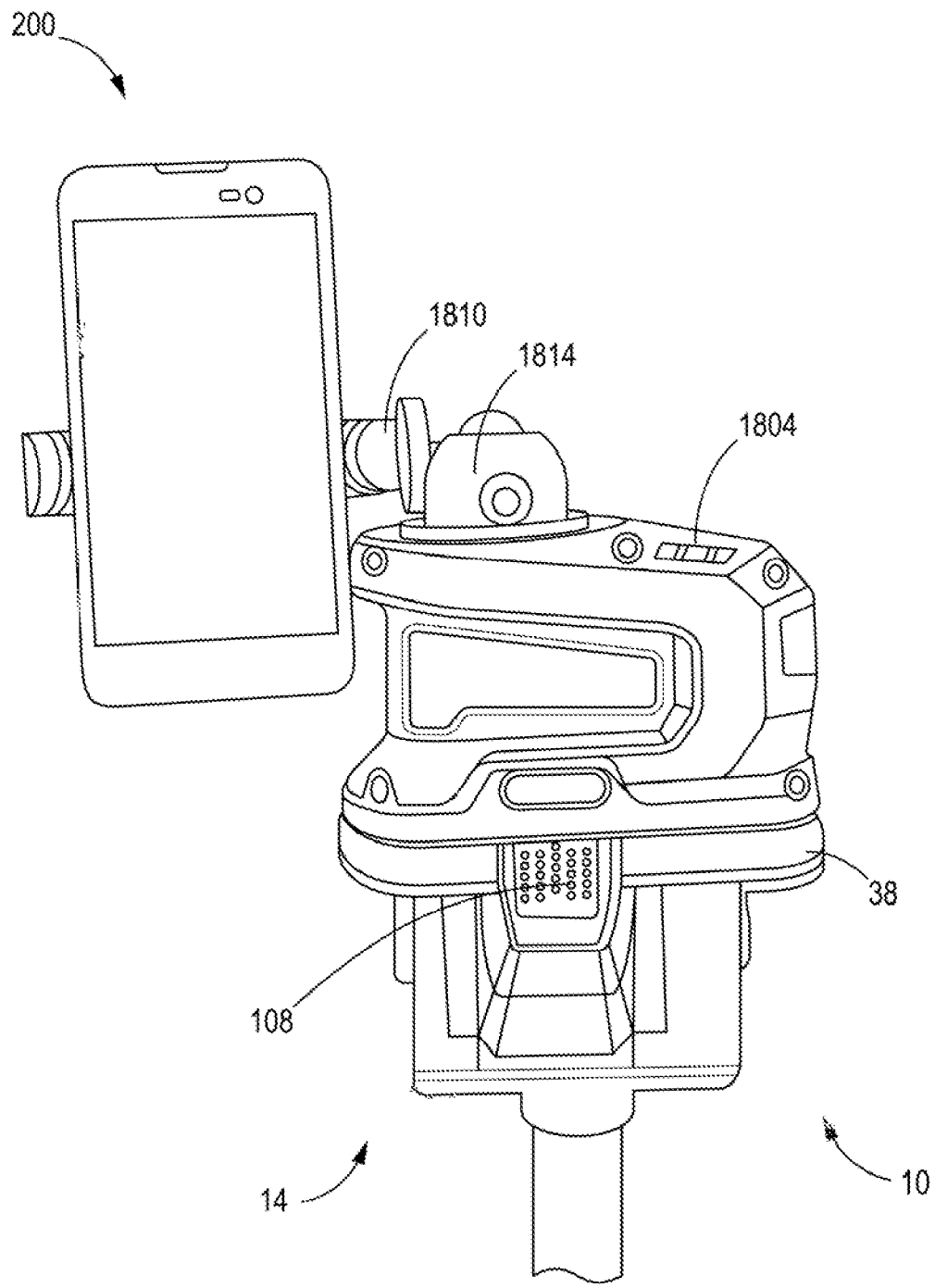

FIGS. 28-32 illustrate accessory devices 200 for supporting handheld devices such as phones or tablets. In some embodiments, the device may be purely mechanical and, as above, not complete a circuit. In some embodiments, the device may include charging ports or cables to recharge the handheld device. FIG. 28 illustrates an accessory device 200 with an upper portion 1704 formed as a tablet stand 1610 including two retaining members 1614. FIG. 29 illustrates another embodiment of an accessory device 200 with an upper portion 1704 formed as a tablet stand 1710 including four retaining members 1714. FIGS. 30-32 illustrate an accessory device 200 with an upper portion 1804 formed as phone stand 1810. The phone stand 1810 may include a pivot joint 1814 that allows a support orientation to be changed from horizontal (FIG. 31) to vertical (FIG. 32).

Figure 33:
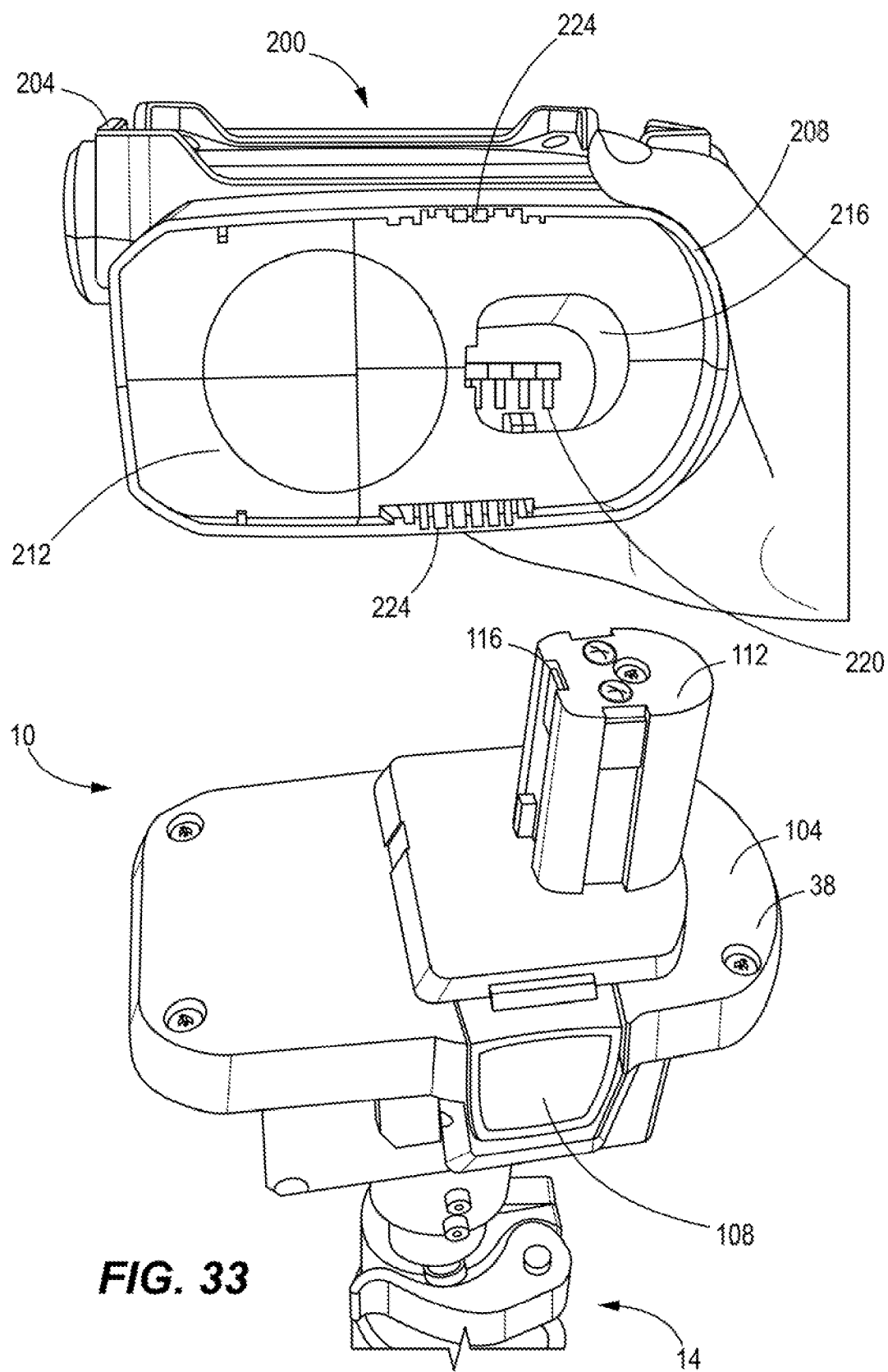
FIG. 33 is a perspective view of another tripod system including the tripod of FIG. 10 and an accessory device.
Figure 34:
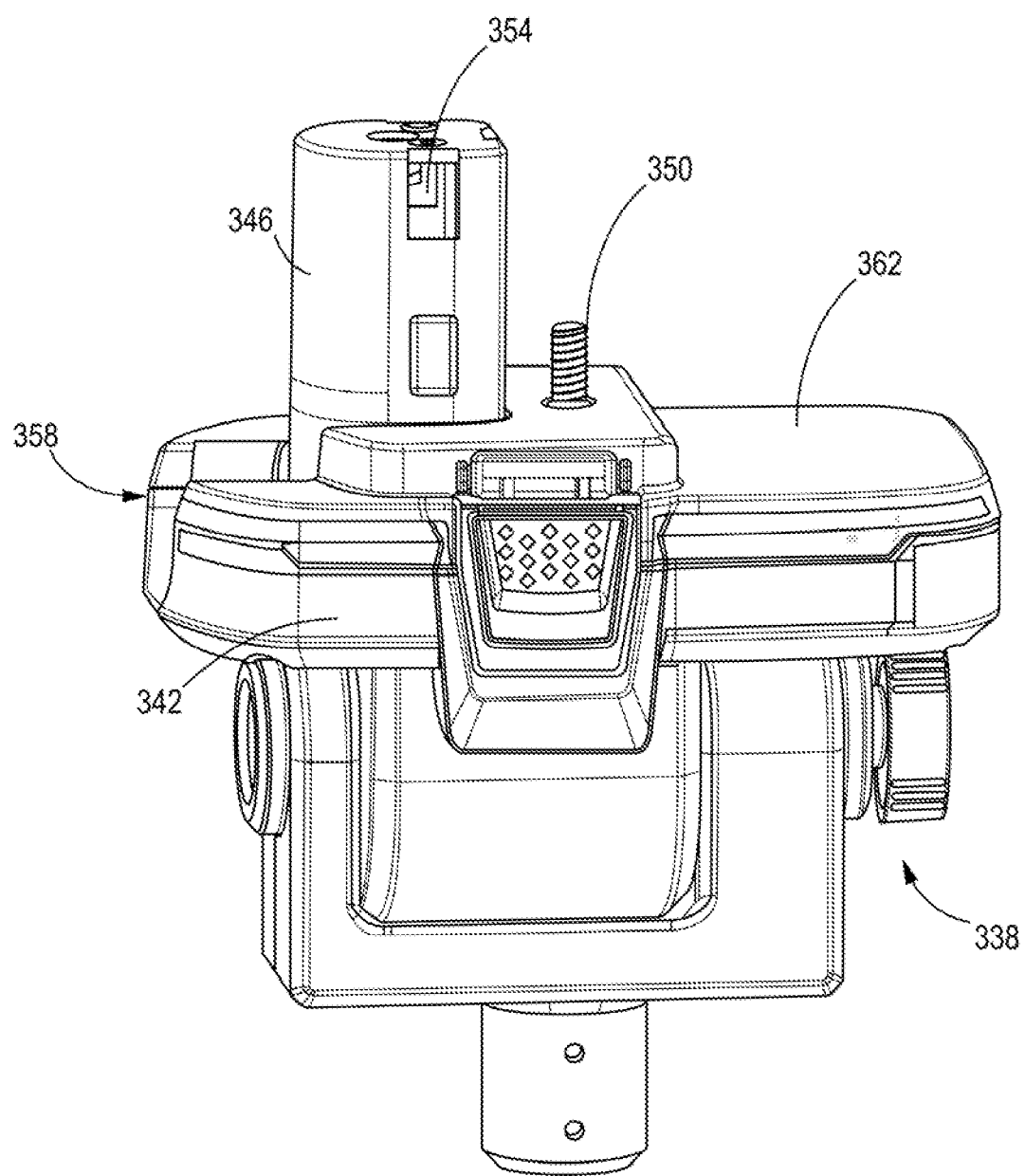
FIG. 34 is a front perspective view of a portion of another tripod system with a movable connection point in a first position.
Figure 35:
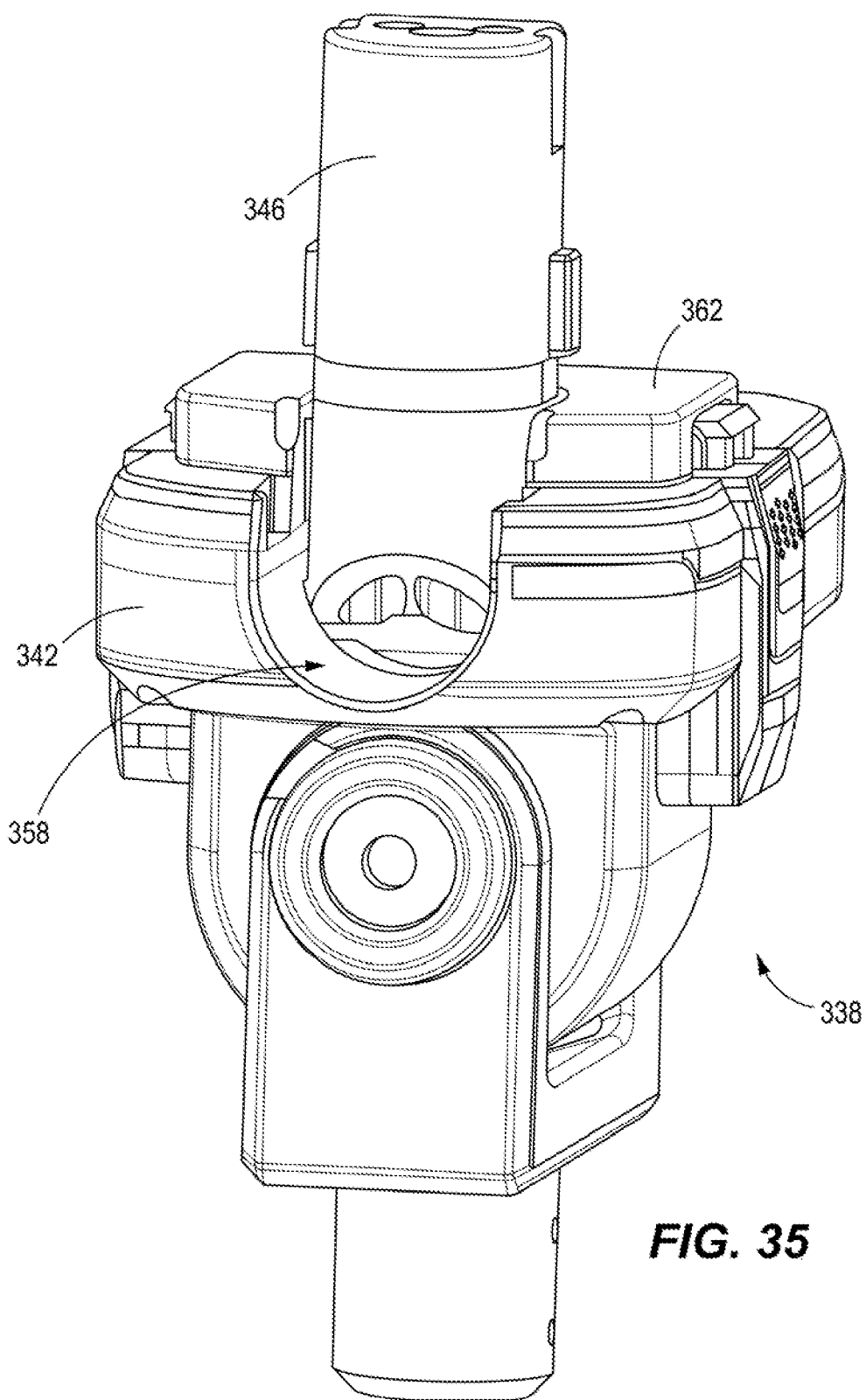
FIG. 35 is a side perspective view of the tripod system of FIG. 34.
Figure 36:
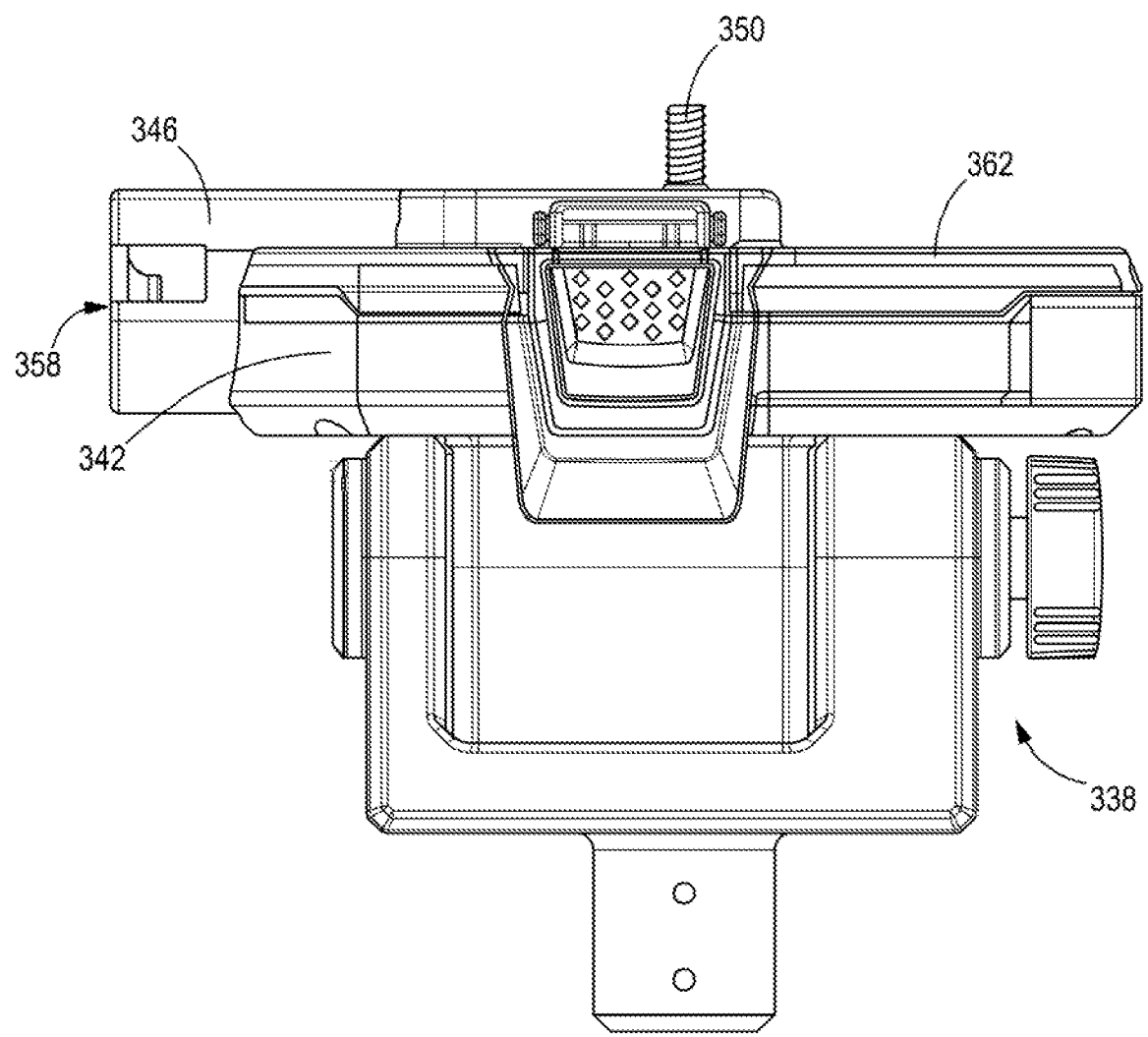
FIG. 36 is a front view of the tripod system of FIG. 34 with the movable connection point in a second position.
Figure 37:
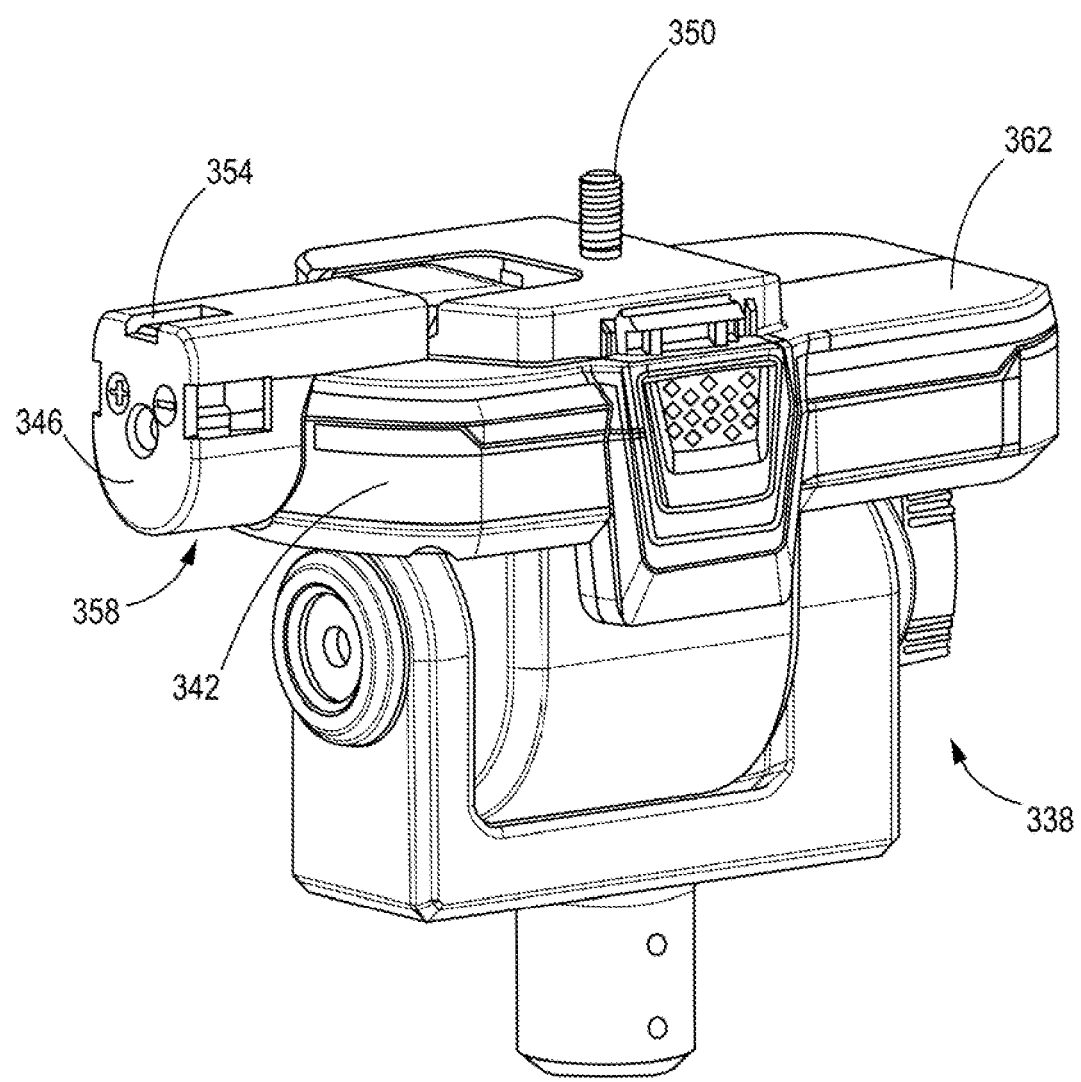
FIG. 37 is a side perspective view of the tripod system of FIG. 36.

FIG. 33 illustrates an embodiment of the system 10 including the accessory device 200 having one set of device mounting features 216 and device electrical contacts 220. The head 38 may include head mounting features 112 in the form of a D-shaped stem. The device mounting features 216 may be in the form of a D-shaped channel. The device mounting features 216 may engage directly with the head mounting features 112 or with the battery mounting features 312 of the battery pack 300 (FIG. 6). The device electrical contacts 220 may electrically couple with the head electrical contacts 116 or with the battery electrical contacts 316 of the battery pack 300 (FIG. 6).

FIGS. 34-37 illustrate a head 338 of another tripod. Similar to the tripod system 10 described above, the head 338 may interface with a variety of different accessory devices. The head 338 may include a body 342, a first head mounting feature 346, and a second head mounting feature 350. The first head mounting feature 346 may be in the form of a D-shaped stem. The first head mounting feature 346 may include head electrical contacts 354. The second head mounting feature 350 may be in the form of a threaded post. More particularly, the second head mounting feature 350 may be a ¼ inch threaded post. The first head mounting feature 346 is configured to interface with the device mounting features 216 of the accessory devices discussed above. The second head mounting feature 350 is configured to interface with a threaded bore of an accessory device.

The first head mounting feature 346 may be movable relative to the body 342 and the second head mounting feature 350. For example, the first head mounting feature 346 may be movable between a first, upright position and a second, stowed position. In the illustrated embodiment, the first head mounting feature 346 pivots relative to the body 342. In other embodiments, the first head mounting feature 346 may translate (e.g., slide vertically into and out of) the body 342. In the illustrated embodiment the first head mounting feature 346 is mounted on a pin extending perpendicular to a length of the first head mounting feature 346. The first head mounting feature 346 may pivot around the pin into and out of a cutout 358 formed in the body 342. In some embodiments, the second head mounting feature 350 may also move relative to the body 342 and the first head mounting feature 346. For example, the second head mounting feature 350 may be spring biased to an extended position, but may automatically be depressed into the body 342 when an accessory device is connected to the first head mounting feature 346.

When in the upright position, the first head mounting feature 346 may extend from a head surface 362 of the body 342. The second head mounting feature 350 may extend from the head surface 362 of the body 342 adjacent the first head mounting feature 346. The second head mounting feature 350 may be inhibited from engaging an accessory device by the first head mounting feature 346 while the first head mounting feature 346 is in the upright position. The first head mounting feature 346 may be positioned to engage an accessory device, such as one of the accessory devices 200 having device mounting features 216 in the form of a D-shaped channel. The accessory device 200 may include an opening configured to align with the second head mounting feature 350 to reduce interference when coupling the accessory device 200 to the head 338.

When in the stowed position, the first head mounting feature 346 may be moved into the cutout 358. In this position, a side surface of the first head mounting feature 346 may be flush with or recessed relative to a highest point or area of the head surface 362 of the body 342. With the first head mounting feature 346 in the stowed position, the second head mounting feature 350 is able to engage an accessory device with a corresponding connection feature, such as a ¼ inch threaded hole. For example, the accessory device may be rotated onto the second head mounting feature 350 without interference from the first head mounting feature 346.

In some embodiments, the head 338 may include a latch mechanism to releasably hold the first head mounting feature 346 in the stowed position and/or the upright position. The latch mechanism may inhibit undesired motion between the upright and stowed positions. For example, the latch mechanism may include one or more detents within the cutout 358 and/or on the first head mounting feature 346. Additionally, or alternatively, the latch mechanism may include magnets, snaps, hooks, and the like.

FIGS. 38-44 illustrate a tripod system 2000 according to another embodiment. The tripod system 2000 may support a variety of devices over a floor, ground, or other surface. The tripod system 2000 includes a tripod 2002, one or more battery packs 2200, 2300, and an accessory device 2400.

Figure 39:
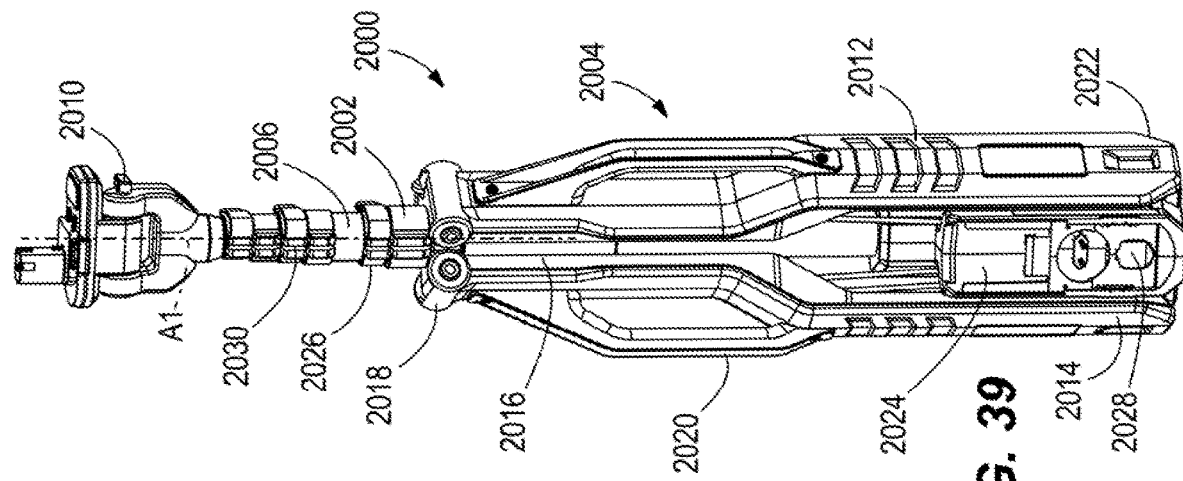
FIG. 39 is a perspective view of the tripod system of FIG. 38 with the tripod in a second or collapsed configuration.
Figure 38:
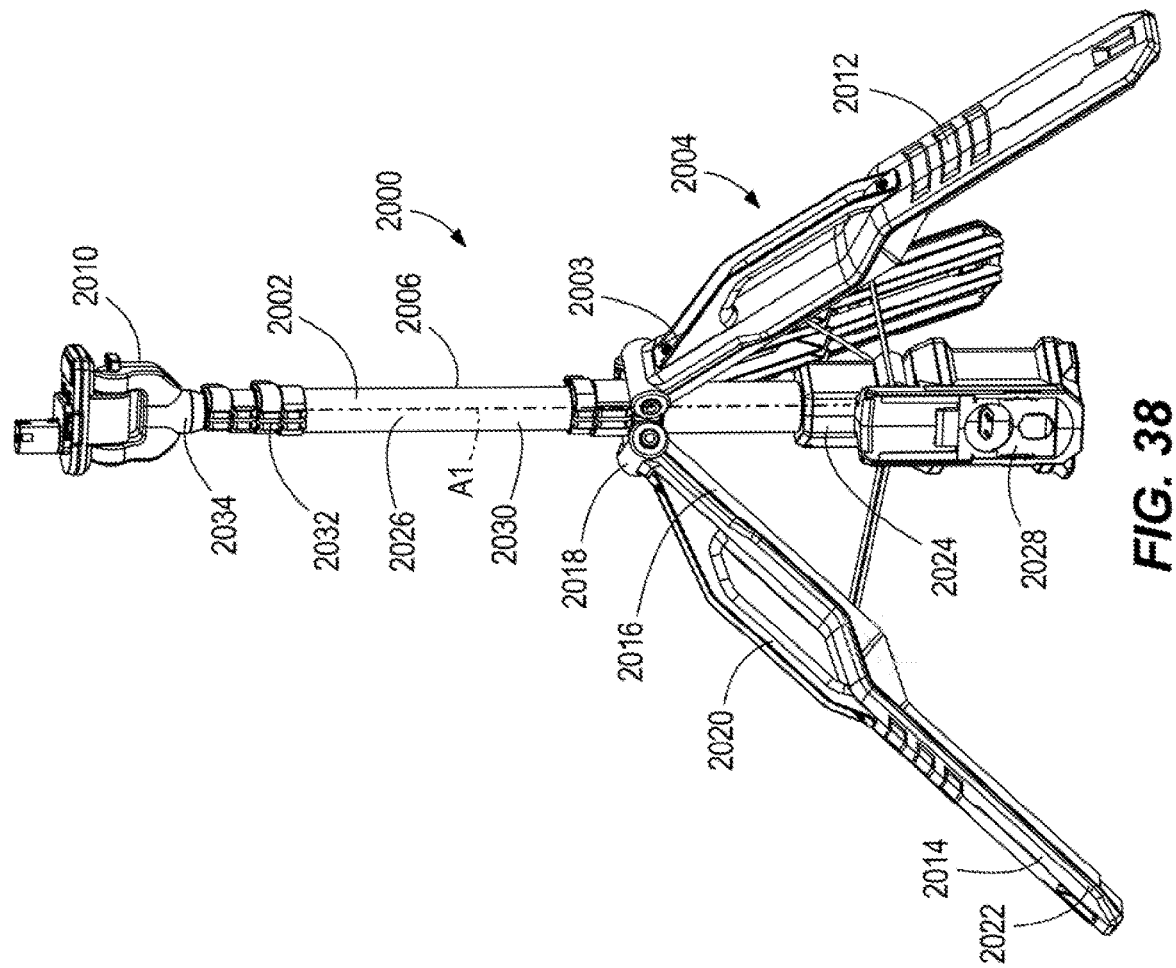
FIG. 38 is a perspective view of a tripod system according to another embodiment, the tripod system including a tripod in a first or expanded configuration.

FIGS. 38-39 illustrate the tripod 2002. The tripod 2002 may physically support the accessory device 2400 above the ground. The tripod 2002 may also electrically communicate with the accessory device 2400. The tripod 2002 may also mechanically support and/or electrically communicate with the first battery pack 2200 or the second battery pack 2300.

The tripod 2002 may include a main body 2003 having a plurality of legs 2004 and a center column 2006, an electrical system 2008 (FIG. 44), and a head assembly 2010. In the illustrated embodiment, the plurality of legs 2004 may include three legs 2012. In other embodiments, the plurality of legs 2004 may include more than three legs. Each leg 2012 may have a first end 2014 positioned adjacent the ground and a second end 2016 connected to the center column 2006. The second end 2016 of each leg 2012 may be connected to the center column 2006 by a leg joint 2018. The joints 2018 may allow the legs 2012 to be moved (e.g., pivoted) between a first position, shown in FIG. 38, in which the first end 2014 of each leg 2012 is spaced from the center column 2006 and is positioned on a support surface, and a second position, shown in FIG. 39, in which the first end 2014 of each leg 2012 is collapsed toward the center column 2006 to collapse the tripod 2002 for easy storage or transport.

Each leg 2012 may also include a handle 2020. In some embodiments, only one or some of the legs 2012 may include a handle 2020. Each handle 2020 may extend along part of the length of the leg 2012 and extend radially outward from the leg 2012. In the illustrated embodiment, each handle 2020 may be removably connected to the leg 2012. For example, the handles 2020 may be connected to the legs by bolts, screws, or other suitable fasteners. In some embodiments, the first ends 2014 of the legs 2012 may include feet 2022 formed as rubber tips to increase friction and inhibit sliding of the tripod 2002 along the support surface.

The center column 2006 may have a first end 2024, a second end 2026, and a longitudinal axis A1 extending through the first end 2024 and the second end 2026. The joints 2018 may be coupled to the center column 2006 between the first end 2024 and the second end 2026. A battery receptacle 2028 may be positioned on the center column 2006 adjacent the first end 2024. The battery receptacle 2028 may mechanically and electrically connect to the first battery pack 2200 and/or the second battery pack 2300. The center column 2006 may include a set of telescoping rods 2030 adjacent the second end 2026. The telescoping rods 2030 may each include a latch 2032 for fixing a relative position of the telescoping rod 2030. The telescoping rods 2030 may include an innermost rod 2034 which connects to the head assembly 2010. As shown in FIG. 38, the telescoping rods 2030 can be extended to adjust a height of the head assembly 2010 relative to the support surface as well as adjusting a length of the center column 2006.

Figure 40:
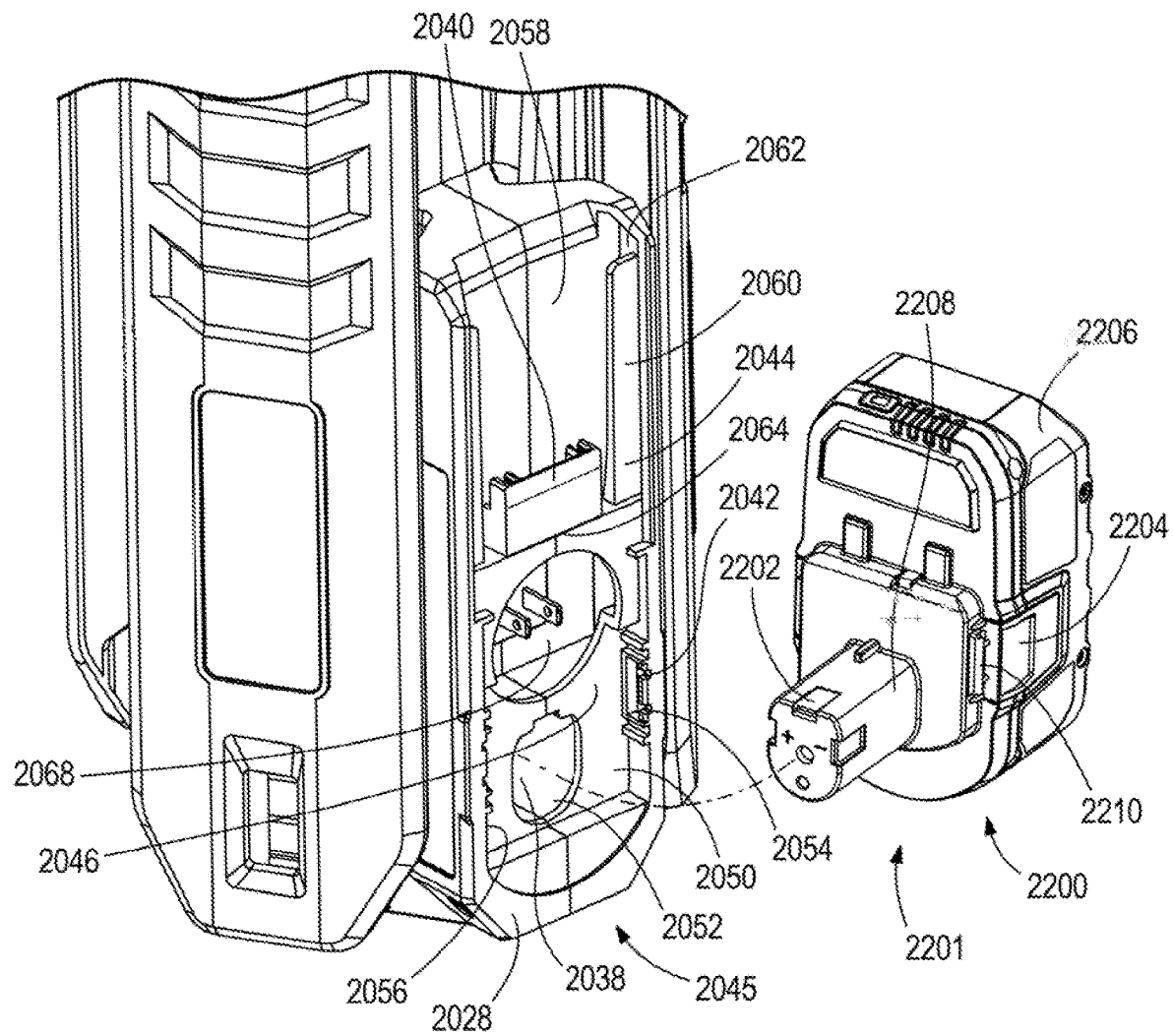
FIG. 40 is a perspective view of a portion of the tripod system of FIG. 38 with a first battery pack positioned adjacent a battery receptacle of the tripod.
Figure 41:
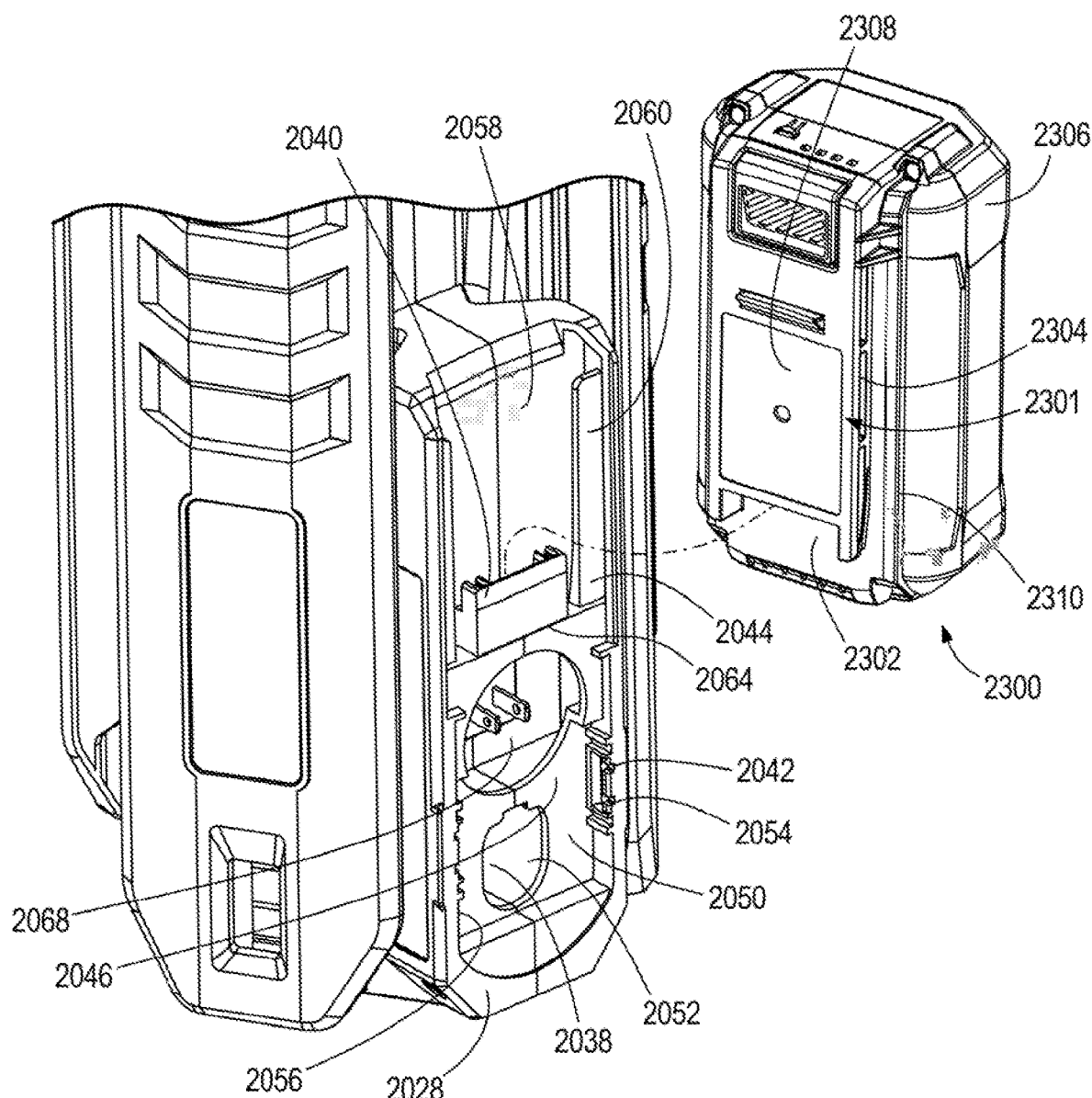
FIG. 41 is a perspective view of a portion of the tripod system of FIG. 38 with a second battery pack positioned adjacent the battery receptacle of the tripod.

As shown in FIGS. 40 and 41, the battery receptacle 2028 may be configured to alternately receive the first battery pack 2200 and the second battery pack 2300. The first battery pack 2200 and the second battery pack 2300 may have different configurations, such as different voltages, different capacities, different sizes, different shapes, and the like. As such, the battery receptacle 2028 may interface with different types of battery packs to power the accessory device 2400 connected to the tripod 2002. For example, the first battery pack 2200 may have a first voltage (e.g., 18 volts), while the second battery pack 2300 may have a second voltage (e.g., 40 volts) that is different than (e.g., greater than) the first voltage. In addition, the first battery pack 2200 may be a tower-style battery pack, while the second battery pack 2300 may be a slide-on-style battery pack. In other embodiments, the battery packs 2200, 2300 may have other voltages and more may be other styles. The battery receptacle 2028 may include a set of first receptacle electrical contacts 2038 and a set of second receptacle electrical contacts 2040. The battery receptacle 2028 may also include a set of first receptacle mechanical connections 2042 and a set of second receptacle mechanical connections 2044. As described below, the first receptacle electrical contacts 2038 and the first receptacle mechanical connections 2042 may be configured to interact with the first battery pack 2200, while the second receptacle electrical contacts 2040 and the second receptacle mechanical connections 2044 may be configured to interact with the second battery pack 2300.

The battery receptacle 2028 may include a first or receptacle interface 2045. The receptacle interface 2045 may include a first battery receiving area 2046 and a second battery receiving area 2048. The first battery receiving area 2046 may include a first recess 2050 and a channel 2052. The first recess 2050 may include the set of first receptacle mechanical connections 2042. In the illustrated embodiment, the first receptacle mechanical connections 2042 may be formed as ridges 2054 on sidewalls 2056 of the first recess 2050. Other mechanical connections may be used as applicable. The channel 2052 may extend into the center column 2006 and may include the first receptacle electrical contacts 2038. The second battery receiving area 2048 may include a second recess 2058. In some embodiments, the first recess 2050 and second recess 2058 may be of similar depth and may appear as one continuous recess. In other embodiments, the first recess 2050 and second recess 2058 may extend to different depths or otherwise appear as two distinct recesses. The second recess 2058 may include the second receptacle mechanical connections 2044 and the second receptacle electrical contacts 2040. In the illustrated embodiment, the second receptacle mechanical connections 2044 may be formed as rails 2060 extending from sidewalls 2062 of the second recess 2058. In other embodiments the second receptacle mechanical connections 2044 may be formed in other ways. The second receptacle electrical contacts 2040 may be positioned on an end wall 2064 of the second recess 2058 and may be positioned between the rails 2060.

As shown in FIG. 40, the first battery pack 2200 may include a first battery interface 2201. The first battery interface 2201 may include first battery electrical contacts 2202 and first battery mechanical connections 2204. The first battery pack 2200 may also include a base 2206 and a stem 2208 extending upward from the base 2206. The first battery electrical contacts 2202 may be positioned on the stem 2208, while the first battery mechanical connections 2204 may be positioned on the base 2206. In the illustrated embodiment, the first battery mechanical connections 2204 may be formed as latches 2210, however other mechanical connections may also be used.

The first battery pack 2200 may have a complementary configuration to the battery receptacle 2028. More particularly, the first battery interface 2201 may have a complementary configuration to the first battery receiving area 2046 of the receptacle interface 2045. That is, the first battery interface 2201 may be configured (e.g., shaped and sized) to be coupled to (e.g., plugged into) the first battery receiving area 2046 of the receptacle interface 2045. Connecting the first battery interface 2021 of the first battery pack 2200 to the receptacle interface 2045 of the battery receptacle 2021 may form a mechanical and electrical connection. In the illustrated embodiment, the first battery pack 2200 may be coupled to the first battery receiving area 2046 of the battery receptacle 2028 such that the stem 2208 extends into the channel 2052 and the base 2206 is at least partially positioned in the first recess 2050. When the first battery pack 2200 is received by the first battery receiving area 2046, the latches 2210 may engage the ridges 2054 to mechanically secure the first battery pack 2200 to the battery receptacle 2028. When the first battery pack 2200 is received by the first battery receiving area 2046, the first battery electrical contacts 2202 may engage the first receptacle electrical contacts 2038 so that the first battery pack 2200 is in electrical communication with the electrical system 2008 of the tripod 2002. The first battery pack 2200 can be removed from the battery receptacle 2028 by activating the latches 2210 to disengage the ridges 2054 on the first recess 2050 and guiding the stem 2208 out of the channel 2052.

As shown in FIG. 41, the second battery pack 2300 may include a second battery interface 2301. The second battery interface 2301 may include second battery electrical contacts 2302 and second battery mechanical connections 2304. The second battery pack 2300 may also include a main body 2306 including a back surface 2308. The second battery interface 2301 may be formed on the back surface 2308. The back surface 2308 may include the second battery mechanical connections 2304. The second battery mechanical connections 2304 may be formed as grooves 2310. The back surface 2308 may also include the second battery electrical contacts 2302.

The second battery pack 2300 may also have a complementary configuration to the battery receptacle 2028. More particularly, the second battery interface 2301 may have a complementary configuration to the second battery receiving area 2048 of the receptacle interface 2045. That is, the second battery interface 2031 may be configured (e.g., shaped and sized) to be coupled to (e.g., slid onto) the second battery receiving area 2048 of the receptacle interface 2045. Connecting the second battery interface 2031 of the second battery pack 2300 to the receptacle interface 2045 of the battery receptacle 2028 may form a mechanical and electrical connection. In the illustrated embodiment, the second battery pack 2300 may be coupled to the second battery receiving area 2048 of the battery receptacle 2028 by positioning ends of the grooves 2310 in engagement with ends of the rails 2060. The second battery pack 2300 may then slide along the second recess 2058 until the second battery electrical contacts 2302 engage the second receptacle electrical contacts 2040. The second battery pack 2300 may be removed from the second battery receiving area 2048 by sliding the second battery pack 2300 along the second recess 2058 until the grooves 2310 disengage from the rails 2060.

The first battery receiving area 2046 and the second battery receiving area 2048 may be positioned to overlap such that only one of the first battery pack 2200 or second battery pack 2300 may be coupled to the battery receptacle 2028 at a time. For example, when the first battery pack 2200 is coupled to the first battery receiving area 2046, the base 2206 of the first battery pack 2200 may at least partially block the second battery receiving area 2048 to inhibit the second battery pack 2300 from being connected to the battery receptacle 2028. Similarly, when the second battery pack 2300 is coupled to the second battery receiving area 2048, the main body 2306 of the second battery pack 2300 may at least partially block the first battery receiving area 2046 to inhibit the first battery pack 2200 from being connected to the battery receptacle 2028.

The illustrated battery receptacle 2028 may also include an AC interface 2068. The AC interface 2068 may be configured to connect to a power cord 2070 (FIG. 44) to receive power from an AC power supply, such as a wall outlet or a generator. The illustrated AC interface 2068 may be positioned between the first battery receiving area 2046 and the second battery receiving area 2048. As such, when a power cord is coupled to the AC interface 2068, the power cord may block both the first battery pack 2200 and the second battery pack 2300 from being connected to the battery receptacle 2028. Similarly, when either the first battery pack 2200 or the second battery pack 2300 is coupled to the receptacle interface 2045, the battery packs 2200, 2300 block the AC interface 2068 from receiving a power cord. A user may, thereby, select with which power source (e.g., the first battery pack 2200, the second battery pack 2300, or the AC power supply) to power the accessory device 2400, but may not simultaneously connect multiple power sources to the tripod 2002.

Figure 43:
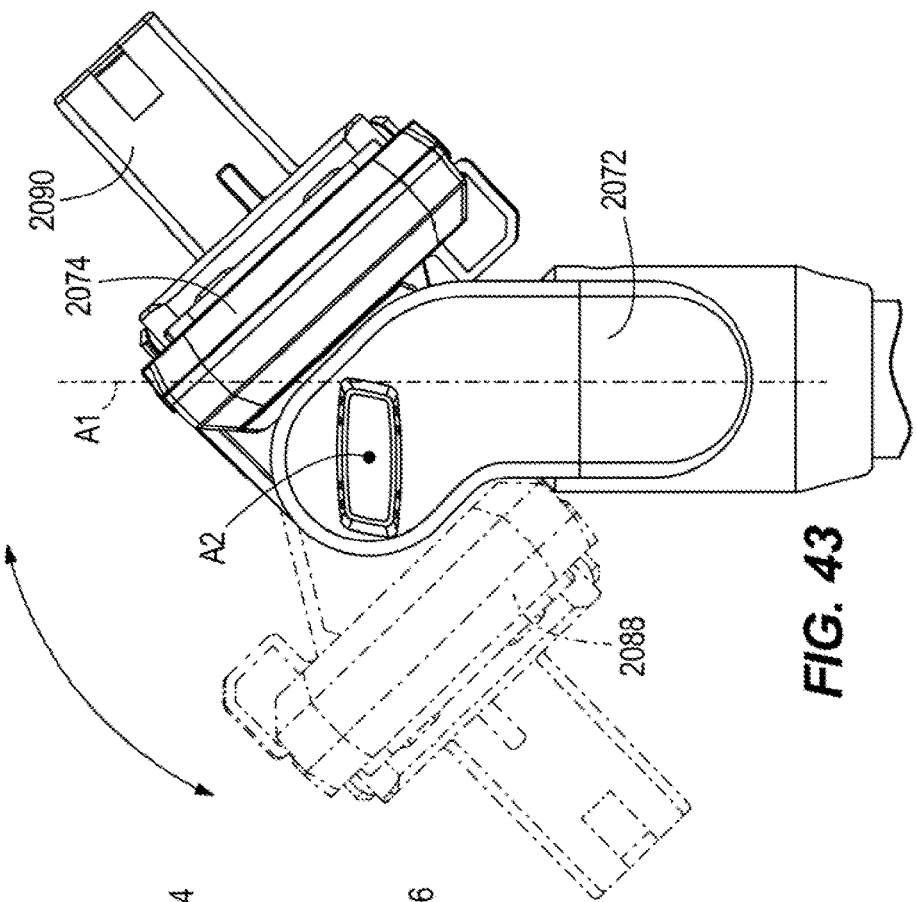
FIG. 43 is a side view of the head of FIG. 42, illustrating the range of motion of the head.
Figure 42:
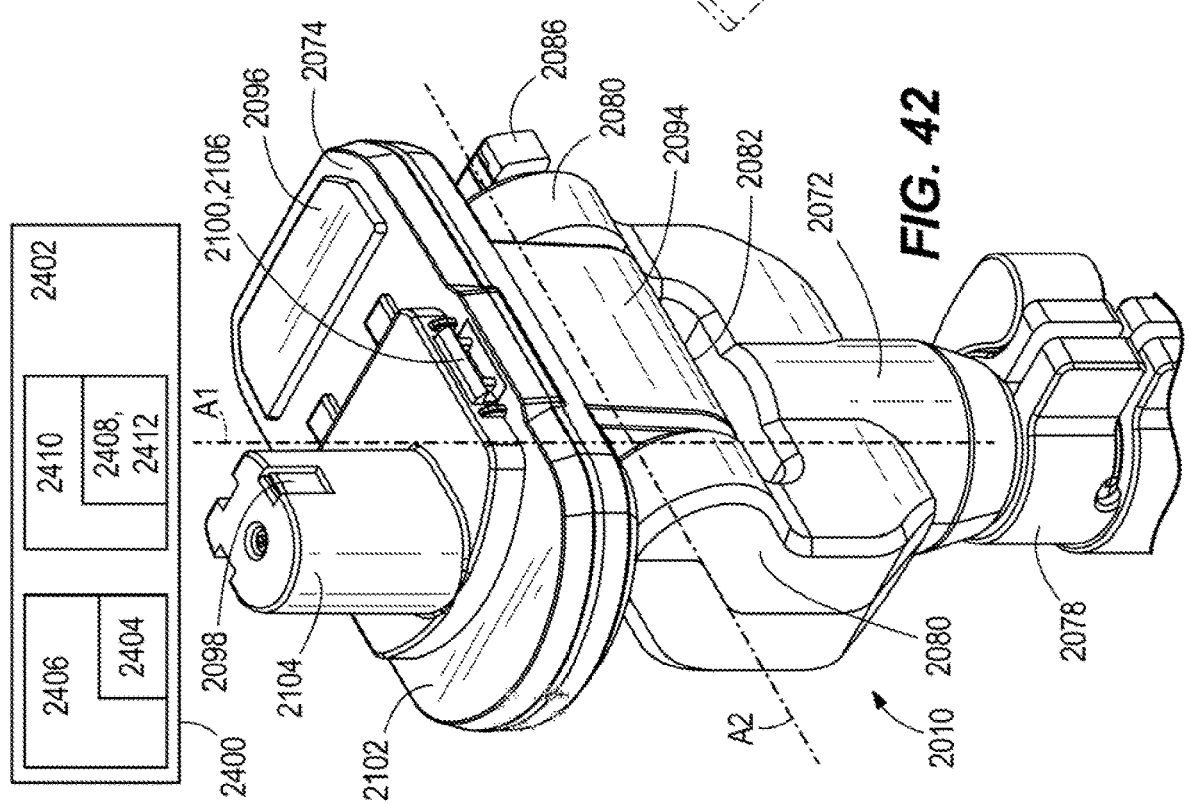
FIG. 42 is a perspective view of a head of the tripod of FIG. 38.

FIGS. 42 and 43 illustrate the tripod head assembly 2010 of the tripod 2002. The tripod head assembly 2010 may include a base 2072 and a head 2074. The base 2072 may be rotatably mounted on the second end 2026 of the center column 2006. For example, the base 2072 may be fixedly connected to the innermost telescoping rod 2034, which may extend and rotate relative to the other telescoping rods 2030.

The base 2072 may be rotated more than 360 degrees about the longitudinal axis A1 defined along the center column 2006. The base 2072 may be fixed in place by fastening the innermost rod latch 2078.

The base 2072 may be U-shaped and may define a pair of arms 2080 extending on either side of a space 2082. The head 2074 may be mounted to the base 2072 for rotation about a second axis A2, generally perpendicular to the longitudinal axis A1 and extending generally parallel to the ground. In the illustrated embodiment, the head 2074 may be mounted at least partially in the space 2082 between the pair of arms 2080. A connecting rod may extend through the pair of arms 2080 and the head 2074 to rotatably couple the base 2072 and the head 2074. A fixing knob 2086 may be connected to one end of the connecting rod to fix the position of the head 2074 with respect to the base 2072. As shown in FIG. 43, the head 2074 may be movable between a first position, as indicated by reference number 2088, and a second position, as indicated by reference number 2090. The second position 2090 is spaced 180 degrees from the first position 2088. In some embodiments, the head 2074 may inhabit any intermediate position between the first position 2088 and the second position 2090. In other embodiments, the head 2074 may inhabit a set of discrete intermediate positions defined between the first position 2088 and the second position 2090.

The head 2074 may include a lower portion 2094 for connecting to the base 2072 and an upper portion 2096 for receiving an accessory device 2400. The upper portion 2096 may also be referred to as a second or head interface 2096. The upper portion 2096 may include a set of first head electrical contacts 2098 and a set of first head mechanical connections 2100. The upper portion 2096 may be shaped similar to the first battery pack 2200. For example, the head 2074 may include a head base 2102 and a head stem 2104. The head base 2102 may include the first head mechanical connections 2100 and the head stem 2104 may include the first head electrical contacts 2098. Therefore, the head interface 2096 may have a complementary configuration to the receptacle interface 2045. In other words, the features of the head interface 2096 may be generally inverse of the features of the receptacle interface 2045 such that the head interface 2096 could hypothetically couple to (e.g., plug into) the receptacle interface 2045.

The accessory device 2400 may include an accessory interface 2402 (also referred to herein as a head receiving area 2402) similar to that of the accessory device 200 shown in FIG. 33. The accessory interface 2402 may have a complementary configuration with the head interface 2402. Therefore, the head receiving area 2402 may receive the upper portion 2096 of the head 2074 to matingly engage the head 2074 and the accessory device 2400. The head receiving area 2402 may be generally the same as the first battery receiving area 2046 of the battery receptacle 2028. Therefore, the accessory interface 2402 may also have a complementary configuration with the first battery interface 2201. Specifically, the head receiving area 2402 may include first accessory electrical contacts 2404 positioned in a first accessory channel 2406 and first accessory mechanical connections 2408 positioned in a first accessory recess 2410.

The accessory device 2400 may be coupled to the head assembly 2010 by bringing together the accessory interface 2402 and the head interface 2096. The head stem 2104 may be aligned with the first accessory channel 2406 and the accessory device 2400 may be brought toward the head 2074 until the head base 2102 is at least partially received in the first accessory recess 2410. When the accessory device 2400 is coupled to the head assembly 2010, the first head mechanical connections 2100, in the form of head latches 2106, may engage the first accessory mechanical connections 2408, in the form of accessory ridges 2412. When the accessory device 2400 is coupled to the head assembly 2010, the first head electrical contacts 2098 may engage the first accessory electrical contacts 2404 so that the accessory device 2400 is in electrical communication with the head assembly 2010. The accessory device 2400 can be removed from the head 2074 by actuating the head latches 2106 to disengage from the accessory ridges 2412 and by moving the head stem 2104 out of the first accessory channel 2406.

Figure 44:
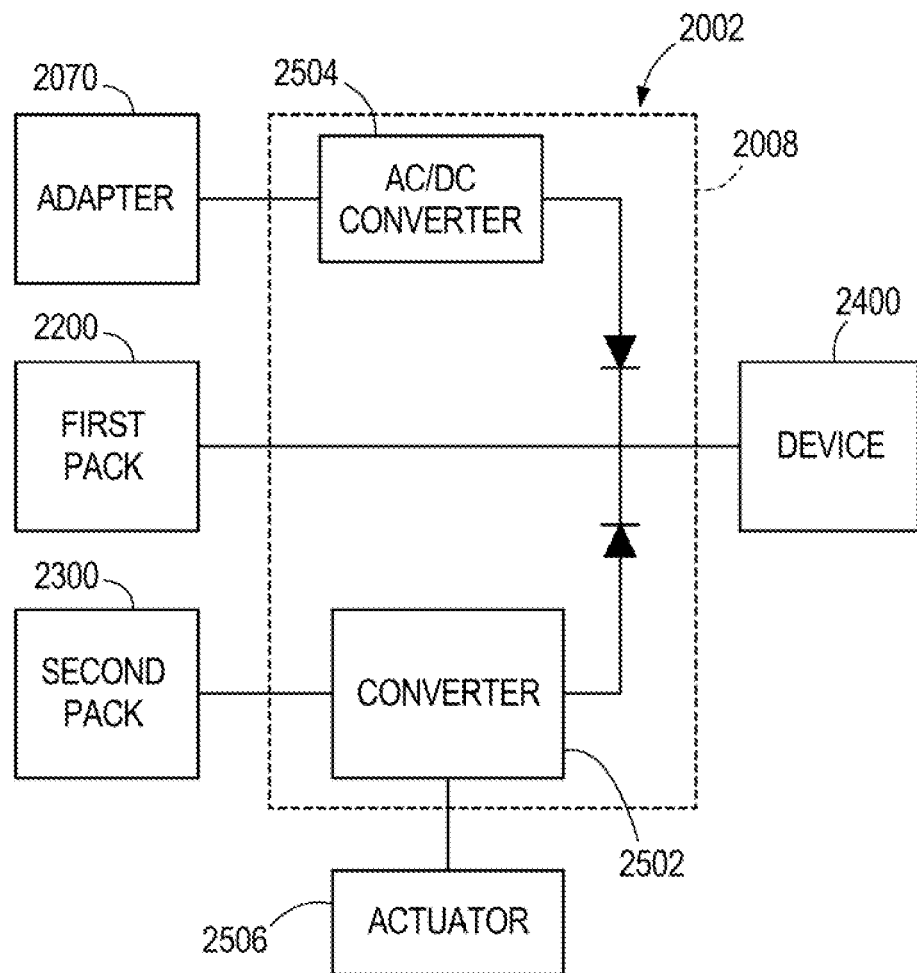
FIG. 44 is a schematic of an electrical system of the tripod system of FIG. 38.

FIG. 44 schematically illustrates a tripod system. The tripod system may include the tripod 2002, the first battery pack 2200, the second battery pack 2300, the AC interface 2068, the tripod electrical system 2008, and the accessory device 2400. The first battery pack 2200, the second battery pack 2300, and an AC power source (via the AC interface 2068) may be alternately couplable to the tripod 2002 to power the accessory device 2400.

The illustrated tripod electrical system 2008 may include circuitry for coupling the different power sources to the accessory device 2400. For example, the tripod electrical system 2008 may include a voltage converter 2502 electrically between the second battery pack 2300 and the accessory device 2400. In some embodiments, the voltage converter 2502 may be a buck converter. In other embodiments, the voltage converter 2502 may be another suitable type of step up/step down voltage converter or regulator. The tripod electrical system 2008 may also include an AC/DC converter 2504 electrically between the AC interface 2068 and the accessory device 2400.

As noted above, the first battery pack 2200 may have a first voltage (e.g., 18 volts), and the second battery pack 2300 may have a second voltage (e.g., 40 volts) that is different than the first voltage. The accessory device 2400 may be configured to operate on the first voltage (e.g., 18 volts). As such, when the first battery pack 2200 is coupled to the tripod 2002, power may flow through the tripod electrical system 2008 directly from the first battery pack 2200 to the accessory device 2400 (e.g., the power may bypass the voltage converter 2502). However, when the second battery pack 2300 is coupled to the tripod 2002, power from the second battery pack 2300 may pass through the voltage converter 2502 to change (e.g., step down or step up) the voltage to the first voltage. In some embodiments, an actuator 2506 may be coupled to the voltage converter 2502. The actuator 2506 may be located on the tripod 2002, such as, for example, on the center column 2006 (FIG. 38). The actuator 2506 may be operated (e.g., depressed) by a user to "wakeup" the second battery pack 2300 and the voltage converter 2502 to avoid discharging the second battery pack 2300 when the accessory device 2400 is not in use.

When an AC power source is coupled to the tripod 2002, power may pass through the AC/DC converter 2504 before reaching the accessory device 2400. The AC/DC converter 2504 may convert the power to DC power and to a suitable voltage, if necessary.

In some scenarios, the first battery pack 2200 may be coupled directly to the accessory device 2400 (such as shown in FIG. 8). In those scenarios, power may flow from the first battery electrical contacts 2202 to the first accessory electrical contacts 2404 to power functions of the accessory device 2400. The accessory device 2400 may then be easily transported and used in other areas without the tripod 2002.

Although aspects have been described in detail with reference to certain embodiments, variations and modifications exist within the scope of one or more independent aspects as described. Various features and advantages of the disclosure are set forth in the following claims.

What is claimed is:

1. A tripod system comprising:
a tripod having a center column, a plurality of legs coupled to the center column, a battery receptacle supported by the center column, and a head supported by the center column, the battery receptacle configured to receive a battery pack such that the battery pack provides power to the tripod; and
a luminaire removably coupled to the head such that the luminaire is configured to be electrically powered by the battery pack through the tripod,
wherein the luminaire is removable from the head and configured to be coupled directly to the battery pack such that the battery pack is secured to the luminaire and provides power to the luminaire.

2. The tripod system of claim 1, wherein the head includes a head interface, and the luminaire includes an accessory interface that has a complementary configuration with the head interface.

3. The tripod system of claim 1, wherein the head includes a pair of latches operable to releasably secure the luminaire to the head.

4. The tripod system of claim 1, wherein the head includes a base and a stem extending from the base, and wherein the stem is configured to couple to the luminaire.

5. The tripod system of claim 1, wherein the head is pivotally coupled to an end of the center column, and wherein the head is pivotable with the luminaire about a pivot axis that is perpendicular to a longitudinal axis of the center column.

6. The tripod system of claim 1, wherein the tripod includes an electrical system electrically connecting the battery receptacle with the head.

7. The tripod system of claim 1, wherein each of the plurality of legs is pivotally coupled to a collar of the center column.

8. The tripod system of claim 1, wherein the center column includes a series of telescoping tubes.

9. The tripod system of claim 1, wherein the luminaire is a three-panel luminaire including a center panel, a left panel rotatably coupled to the center panel, and a right panel rotatably coupled to the center panel.

10. The tripod system of claim 1, wherein the luminaire includes a support structure configured to support the luminaire on another object when the luminaire is disconnected from the head.

11. A tripod system comprising:
a tripod having a center column, a plurality of legs coupled to a collar on the center column, a battery receptacle supported at a first end of the center column, and a head supported at a second end of the center column, the battery receptacle having a first interface configured to mechanically and electrically couple to a battery pack to align and constrain the battery pack on the tripod; and
a luminaire removably coupled to the tripod, the luminaire having a second interface configured to mechanically and electrically couple to the head to align and constrain the luminaire on the tripod, wherein the second interface is also configured to alternately mechanically and electrically directly couple to the battery pack to align and constrain the battery pack on the luminaire.

12. The tripod system of claim 11, wherein the luminaire includes a center panel having a first plurality of light sources, a left panel rotatably coupled to the center panel by a left hinge and having a second plurality of light sources, and a right panel rotatably coupled to the center panel by a right hinge and having a third plurality of light sources.

13. The tripod system of claim 12, wherein the first plurality of light sources, the second plurality of light sources, and the third plurality of light sources include light emitting diodes.

14. The tripod system of claim 11, wherein the first interface includes a first electrical contact configured to interface with the battery pack, and wherein the second interface includes a second electrical contact configured to alternately interface with the head and the battery pack.

15. A tripod for use with a luminaire and a battery pack, the tripod comprising:
   a main body including
      a center column having a first end, a second end opposite the first end, a longitudinal axis extending through the first end and the second end, and a collar positioned between the first end and the second end, and
      a plurality of legs coupled to the collar of the center column;
   a battery receptacle supported at the first end of the center column, the battery receptacle having a first interface configured to couple to the battery pack and a second interface configured to couple to a power cord;
   a head supported at the second end of the center column, the head configured to removably receive the luminaire; and
   an electrical system connecting the head with the battery receptacle such that when the luminaire is received by the head, the luminaire receives power from the battery pack or the power cord.

16. The tripod of claim 15, wherein the first interface includes a recess and electrical contacts positioned within the recess, wherein the recess is configured to receive at least a portion of the battery pack, and wherein the electrical contacts are configured to electrically couple to the battery pack.

17. The tripod of claim 15, wherein the second interface includes a set of prongs configured to engage the power cord to electrically couple the second interface with the power cord.

18. The tripod of claim 15, wherein when the battery pack is coupled to the first interface, the second interface is blocked from receiving the power cord.

19. The tripod of claim 15, wherein when the power cord is coupled to the second interface, the first interface is blocked from being connected to the battery pack.

20. The tripod of claim 15, wherein the second interface is configured to receive alternating current (AC) power, wherein the first interface is configured to receive direct current (DC) power, and wherein the electrical system further includes an AC/DC converter configured to convert AC power received from the second interface into DC power to be supplied to the head.

* * * * *